Patented Sept. 25, 1945

UNITED STATES PATENT OFFICE 2,385,379

MANUFACTURE OF PIGMENTS AND PRODUCTS MADE THEREWITH

Harold R. Rafton, Andover, Mass., assignor to Raffold Process Corporation, a corporation of Massachusetts No Drawing. Application July 20, 1940,
Serial No. 346,661

19 Claims. (Cl. 106—306)

My invention relates to the treatment of pigment, more particularly artificially prepared calcium carbonate.

It further relates to the pigment, particularly artificially prepared calcium carbonate, so treated, and the novel products made therewith, particularly paints, enamels, lacquers, and other coatings, plastics, putties, filled paper or fabrics, coated paper or fabrics, rubber, rubber substitutes or rubber-like materials, and other products in which pigment is used, particularly as a filler, coating, loading, weighting, extending, reinforcing agent, opacifying agent, finishing material or the like.

The principal object of my invention is the treatment of a pigment, particularly artificially prepared calcium carbonate, to impart specific and controlled characteristics, and the pigment so produced.

An important object is the production of paints, enamels, lacquers and other coatings with said treated pigment, and the product so produced.

A further object is the production of filled paper and coated paper with said treated pigment, and the filled paper and coated paper so produced.

A further object is the production of rubber, rubber substitutes, or rubber-like materials made with said treated pigment, and the product so produced.

A further object is the production of product comprising a plastic and said treated pigment, and the product so produced.

Other objects and advantages of this invention will become apparent during the course of the following description.

Calcium carbonate may be artificially prepared in a variety of ways, all of which are well known. Examples of some of the common methods are: by reaction of lime, or calcium hydroxide, and carbon dioxide; by the causticizing reaction, e. g., the reaction of sodium carbonate and lime; by the reaction of an alkali metal carbonate such as sodium carbonate and a soluble calcium salt such as calcium chloride; by the elimination of carbon dioxide from calcium bicarbonate solution by heat or reduction of pressure, or by reaction of calcium bicarbonate with lime; or by any combination of the above. Sodium bicarbonate is sometimes utilized in the reaction, as is also potassium or ammonium carbonate, and sodium, potassium or ammonium hydroxide may be present in certain cases. When I speak of artificially prepared calcium carbonate, I mean calcium carbonate artificially prepared by the above mentioned or other known methods in contradistinction to naturally occurring calcium carbonate, such as marble, limestone and natural chalk, or refined forms thereof such as the comminuted form, usually ground, which may be subjected to mechanical, air or water separation or classification, and may be otherwise purified if desired.

The calcium carbonates artificially prepared vary considerably in physical characteristics and possibly also in chemical constitution and crystalline form or other form. Some may be relatively coarse in particle size, others may be relatively fine, examples of the latter being the calcium carbonates made by the processes disclosed in the patents issued to Rafton and Brooks, No. 2,058,503, of October 27, 1936, and No. 2,062,255, of November 24, 1936. In many instances a given calcium carbonate, although entirely satisfactory from the standpoint of certain characteristics such for example as particle size, alkalinity, softness and the like, may be unsatisfactory because of high oil absorption, high adhesive requirement or other characteristic. In many cases such unsatisfactory characteristic makes it unfeasible, if not impossible, to market a calcium carbonate otherwise satisfactory or highly desirable for certain uses, or if possible to market it at all, only at a price lower than it would otherwise command.

I have discovered, however, that by the application of pressure, in certain cases combined with momentary attrition, I am able to impart to artificially prepared calcium carbonate not possessing the same, characteristics hitherto impossible of acquirement or if hitherto possible of acquirement by other methods, only at a great expense, and have produced artificially prepared calcium carbonate with certain new and in some cases unique characteristics.

For example, by my process I have been able to reduce greatly the oil absorption of artificially prepared calcium carbonates, when used for instance in paints, enamels and other coatings, and putties. By my process, I have also been able to reduce greatly the adhesive requirements of artificially prepared calcium carbonates, when used, for example, in coated paper or in water paints; I have also been able to reduce the water absorptive capacity of artificially prepared calcium carbonate, and in general have been able to impart greatly improved qualities to artificially prepared calcium carbonate. Lower pressures give some results. Better results are in many cases obtainable by the use of higher pressures, and in many cases I therefore prefer to use higher pressures.

One method of carrying out my invention of applying pressure, preferably a considerable or high pressure, to artificially prepared calcium carbonate is by means of some device which will squeeze or compact a given amount of such calcium carbonate by pressure. A good example of this type of apparatus is a press, conveniently an hydraulic press. By placing such calcium carbonate in a mold with a moveable plunger top, in an hydraulic press, and forcing the plunger down into the mold, thus applying pressure to the calcium carbonate, I have produced such calcium carbonate of very greatly improved characteristics.

I have used a number of molds for pressing such calcium carbonate, and I describe the three following as illustrative examples. The first, hereinafter referred to as the "1¾ inch mold," was a vertical steel cylinder 1½" high and 1⅛" in diameter, having a 1¾" hole drilled axially therethrough. A snugly fitting removable steel cylinder ½" high and 1¾" in diameter, pressed into one end of the axial hole, constituted the bottom of the mold, and a steel cylinder 1⅛" long and 1¾" in diameter constituted the movable plunger, fitting with a sliding fit into the top end of the axial hole of the mold. The plunger could be removed, calcium carbonate placed in the hole constituting the chamber of the mold, and then the plunger reinserted and pressed against the calcium carbonate, as in an hydraulic press.

The second mold, hereinafter referred to as the "2 inch mold," was similarly constructed, but of different dimensions. The vertical steel cylinder constituting the body of the mold was 12⅜" high, with an outside diameter of 4", and an inside diameter of 2". The bottom of the mold was a removable steel cylinder 2" in height and 2" in diameter, pressed into the mold, and the plunger was a steel cylinder 11½" long and 2" in diameter fitted to the mold with an easy sliding fit.

The third mold, hereinafter referred to as the "5 inch mold," was also similarly constructed, but of different dimensions. The vertical cylinder constituting the body of the mold was 10¼" high, having an outside diameter of 6⅝", and an inside diameter of 5". The bottom of the mold was a removable steel cylinder 1" in height and 5" in diameter, pressed into the mold, and the plunger was a steel cylinder 12¼" long and 5" in diameter fitted to the mold with a clearance of .010".

As an example of the effect obtained by subjecting a given artificially prepared calcium carbonate to high pressures, I cite the tests in Table I, which were made on 171.4 gram samples in the 2" mold in an hydraulic press. The calcium carbonate used had been made by carbonation of an aqueous slurry of slaked lime with carbon dioxide, and was dry in powder form. The samples, on being pressed, produced cylindrical cakes 2" in diameter (the diameter of the mold), and of varying thicknesses according to the pressure applied. An average sample of each cake was obtained by sawing through its vertical axis with a hack saw, and the sample obtained after comminution with a minimum of mechanical work, was tested for "oil absorption." This was the method used for obtaining a uniform sample of all cakes tested referred to herein, unless otherwise indicated.

The oil absorption test used followed substantially the so-called "standard rub-out method" for determining the oil absorption of pigments. This is accomplished by incorporating successive portions of raw linseed oil from a carefully weighed container with 1.000 gram of calcium carbonate on a glass plate by means of a spatula until a pigment-oil mass of definite consistency is obtained. The oil container is then again carefully weighed to determine accurately the quantity of oil used, and the results are expressed as grams of oil required per one hundred grams of pigment. This type of test is described in detail in "Physical and Chemical Examination of Paints, Varnishes, Lacquers and Colors," by Henry A. Gardner, 6th edition, October 1933, pages 475-7. Although the oil absorption test is probably not accurate to within more than one unit, if in some cases it is that accurate, the figures in the tenths place are given as determined. (The individual illustrative tests reported herein will be serially numbered for convenience in referring thereto.)

Table I

| Test No. | Pressure in lbs. per sq. inch on the calcium carbonate | Oil absorption | Approximate thickness of cake, inches |
| --- | --- | --- | --- |
| 1 | 0 | 59.5 | [1] 8½ |
| 2 | 5,090 | 42.9 | 2¹⁵⁄₆₄ |
| 3 | 10,180 | 41.0 | 2¹³⁄₆₄ |
| 4 | 15,280 | 32.1 | 2⅛ |
| 5 | 21,640 | 29.8 | 2½ |
| 6 | 25,460 | 28.3 | 2¼ |
| 7 | 30,570 | 27.6 | 2⅛ |

[1] This was the average height to which the powder came in the mold in each test before pressing.

Test No. 1, with the pressure reading of "0," was the original calcium carbonate in powder form to which no pressure had been applied, and the oil absorption of this was determined to provide a blank test with which to compare the oil absorption of the pressed samples. The great reduction of the oil absorption produced by the application of such pressures as indicated is apparent on comparison of the results of Tests No. 2-7 with that of Test No. 1.

As an example of the effect obtained by subjecting a given artificially prepared calcium carbonate to much higher pressures, I cite the tests in Table II, which were made on 2.0 gram samples in the 1¾" mold in an hydraulic press. The calcium carbonate used was dry in powder form, and, while it had been made by carbonation of an aqueous slurry of slaked lime with carbon dioxide, it was a different lot from that used in Tests No. 1-7. The samples, on being pressed, produced cakes 1¾" in diameter, and from approximately ⅛" to ₁₆" thick according to the pressure applied. Each cake was then comminuted with a minimum of mechanical work, and an oil absorption test was made thereon as before.

Table II

| Test No. | Pressure in lbs. per sq. inch on the calcium carbonate | Oil absorption |
| --- | --- | --- |
| 8 | 0 | 69.8 |
| 9 | 48,500 | 24.0 |
| 10 | 72,500 | 21.5 |
| 11 | 100,000 | 22.3 |
| 12 | 121,000 | 19.0 |
| 13 | 150,000 | 15.2 |

Here, again, Test No. 8 with the pressure reading of "0," was the original calcium carbonate to which no pressure had been applied. Although the oil absorption of either or both of Tests No. 10 and 11 appear to be slightly out of line, it should be remembered that the oil absorption figures, as stated above, are probably not accurate to more than within about one unit. Regardless, however, of any possible minor discrepancy, this series of tests gives a very good idea of the general magnitude of the effect of such higher pressures on the oil absorption of such artificially prepared calcium carbonate.

If the calcium carbonate to be pressed is in a comminuted form, such as a powder, which is apt to be more or less bulky, the reduction in bulk due to the pressing is substantial, as shown in the fourth column of Table I. In general I have found that the greater the quantity pressed in a mold of given diameter, the less is the effect of the pressure, within reasonable limits, probably due to the localizing of the pressure because of unevenness of packing and inability of the larger charge to distribute itself uniformly when pressure is applied.

This is illustrated by Tests Nos. 14-20 given in Table III, which show the effect of the amount of sample used on the oil absorption obtained at a given pressure. In these tests the same calcium carbonate was used as in the tests in Table I, and the same mold, i. e., the 2" mold. Test No. 2 is repeated from Table I as it fits into this series, being made at substantially the same pressure.

*Table III*

| Test No. | Pressure, lbs. per sq. inch on calcium carbonate | Grams calcium carbonate used | Cake thickness, inches | Oil absorption |
|---|---|---|---|---|
| 14 | 5,120 | 10 | 3/16 | 33.9 |
| 15 | 5,120 | 15 | 7/32 | 37.5 |
| 16 | 5,120 | 20 | 5/16 | 35.4 |
| 17 | 5,120 | 50 | 13/16 | 36.6 |
| 18 | 5,120 | 75 | 13/16 | 36.0 |
| 19 | 5,120 | 100 | 1 1/16 | 37.8 |
| 20 | 5,120 | 125 | 2 3/8 | 41.6 |
| 2 | 5,090 | 171.4 | 2 13/16 | 42.9 |

The ten gram sample (Test No. 14) was found, by preliminary trial, to be about the smallest practicable sample to use in the 2" diameter mold, because of difficulty of uniform distribution of any smaller sample on the bottom of the mold due to the depth of the mold. The above results, while apparently not absolutely consistent within the limit of the probable error of the experimentation (Test No. 15 in particular appears to be a little out of line), do point to the conclusion that the maximum effect of pressure is obtained using the smallest practicable amount of the calcium carbonate in question which can be employed in a given mold.

Similar results are indicated by the tests made in the 5" mold and shown in Table IV, although in this series the amounts pressed were not proportionately so small for the size of the mold as those shown in Table III. The same sample of calcium carbonate was used as in the tests in Table III.

*Table IV*

| Test No. | Pressure, lbs. per sq. inch on calcium carbonate | Pounds calcium carbonate used | Cake thickness, inches | Oil absorption |
|---|---|---|---|---|
| 21 | 5,600 | .5 | 9/16 | 38.7 |
| 22 | 5,600 | 2.5 | 3 | 40.0 |
| 23 | 5,600 | 4.5 | 5 7/16 | 42.0 |

I have stated previously herein that there appears to be a localization of pressure on the cake, probably due to an unevenness of packing and inability of the charge of calcium carbonate in the mold to distribute itself uniformly when pressure is applied, particularly when larger quantities are used in the mold. This may be illustrated in connection with the cakes of Tests No. 22 and 23. The cakes of these tests, instead of being sampled by sawing through, were sampled at a number of points and the oil absorption determined on each sample taken. The respective averages of these determinations were reported as the oil absorptions for Tests Nos. 22 and 23 in Table IV above. As shown in Table V, the actual oil absorption figures varied widely at various points in the cakes, indicating localization of the effect of the pressure with resultant lack of uniformity throughout the cakes.

*Table V*

| | Cake of test No. 22 | Cake of test No. 23 |
|---|---|---|
| Oil absorption of individual samples taken at various points in the cake | 34.5<br>42.3<br>36.3<br>39.4<br>42.5<br>39.2<br>38.5<br>42.1<br>39.6<br>45.5 | 34.2<br>41.3<br>40.8<br>51.5 |
| Average of oil absorption | 40.0 | 42.0 |

The lessening of the effect obtained by pressure with increased size of the charge, as well as the non-uniformity resulting when pressing relatively thick cakes, may, however, be overcome in a great measure or even in certain cases substantially eliminated by making the mold with a diameter slightly larger at its base than at its top, while still retaining the plunger, if desired, with an end area substantially the same as that of the top of the mold. For example, in a mold of circular cross section, the mold would then be in the shape of the frustum of a cone, and in a mold of square or rectangular cross section, the mold would be in the shape of a frustum of a pyramid.

However, even though fairly thick cakes of calcium carbonate pressed in a mold having vertical walls, such as the 5" mold referred to herein, may be somewhat lacking in uniformity, the cakes may be comminuted after pressing, thereby bringing about thorough mixing, and the mixed material will then be of uniform quality.

Sometimes it is possible to improve the effect of pressing, by comminuting the cakes after pressing with thorough mixing, and then repressing the resultant comminuted material. This is doubtless due, in some measure at least, to lessening or eliminating the effect of non-uniformity of distribution in the mold because of the lesser bulk of the once pressed material. An example illustrating this is shown in Table VI, the cakes from Tests Nos. 22 and 23 (shown in Tables IV and V) having been powdered, mixed, and then again subjected to pressure.

*Table VI*

| Test No. | Pressure, lbs. per sq. inch on calcium carbonate | Oil absorption |
|---|---|---|
| 22 | 5,600 | 40.0 |
| 23 | 5,600 | 42.0 |
| 24 (consisting of cakes of Tests Nos. 22 and 23, powdered, mixed and pressed) | 4,580 | 34.3 |

Table VI shows that improved results are sometimes obtained by comminuting relatively thick cakes and pressing a second time, even though the pressure used in the second pressing may not be quite so high as that used in the first pressing.

I have given previously herein illustrations of the results of pressing samples of artificially prepared calcium carbonate in the range from about 5,000 lbs. to 150,000 lbs. per square inch.

As an example of the effect of pressure in the range from zero to 5,000 lbs. per square inch, I cite a series of tests made on the same calcium carbonate as used in the tests in Table I, in the same mold, i. e., the 2" mold. In order to insure obtaining substantially the maximum effect of the pressure, 10 gram samples were used, as were indicated to be suitable for obtaining such effect by the tests in Table III. This series of tests is shown in Table VII in which Test No. 14 is also included as it fits into this series, being made with the same amount of the same calcium carbonate in the same mold.

*Table VII*

| Test No. | Pressure, lbs. per sq. inch on the calcium carbonate | Oil absorption |
| --- | --- | --- |
| 1 | 0 | 59.5 |
| 25 | 100 | 58.3 |
| 26 | 200 | 59.0 |
| 27 | 300 | 55.7 |
| 28 | 400 | 53.4 |
| 29 | 500 | 55.3 |
| 30 | 600 | 53.4 |
| 31 | 700 | 52.0 |
| 32 | 800 | 50.1 |
| 33 | 900 | 50.6 |
| 34 | 1,000 | 46.5 |
| 35 | 1,250 | 46.5 |
| 36 | 1,500 | 42.6 |
| 37 | 1,750 | 35.3 |
| 38 | 2,000 | 41.4 |
| 39 | 2,500 | 40.7 |
| 40 | 3,000 | 38.5 |
| 41 | 4,000 | 36.5 |
| 42 | 5,000 | 34.1 |
| 14 | 5,120 | 33.9 |

Although Tests Nos. 28 and 37 of this series appear to be somewhat out of line, the series as a whole shows very clearly the trend of the effect of the increase of pressure between zero and 5,120 lbs. per square inch on this particular sample of calcium carbonate, and further shows the relative ineffectiveness of the lower pressures, even when used on such small quantity of calcium carbonate that a relatively thin cake results.

The presence of a liquid, water for example, at least in amounts so far tested, appears to have little influence on the results obtained by pressure exerted on calcium carbonate in a mold. For example, using the 2" mold, a calcium carbonate containing 80% dry content (20% water by weight) Test No. 43, gave results analogous to those obtained with the same calcium carbonate in a dry state, Test No. 2 (both used in the same quantity, on a dry basis, i. e., 171.4 grams). The same is true with liquids other than water, e. g. linseed oil. This is illustrated in Test No. 44, on a sample containing 20% of raw linseed oil on the weight of the dry calcium carbonate present (171.4 grams). Portions of calcium carbonate from the same sample were used in each test, (i. e., that used in Test No. 1). The results are shown in Table VIII.

*Table VIII*

| Test No. | Pressure, lbs. per sq. inch on the calcium carbonate | Liquid present | Oil absorption |
| --- | --- | --- | --- |
| 1 | 0 | None | 59.5 |
| 2 | 5,090 | do | 42.9 |
| 43 | 5,090 | Water | 43.3 |
| 44 | 5,090 | Linseed oil | [1] 41.5 |

[1] This is the adjusted result taking into consideration both the oil added in the oil absorption test and the oil already present in the sample.

Samples containing lesser percentages of water and linseed oil show results of the same general order of magnitude.

Calcium carbonate may be treated so that the particles become coated with various substances, such as oils, fats, fatty acids, resins, resin acids, rosin, soaps and many other materials, by processes which will be described in detail later herein. I have found that pressure has an effect of about the same order of magnitude on coated artificially prepared calcium carbonate as it has on uncoated artificially prepared calcium carbonate.

I have found other methods suitable for exerting pressure on artificially prepared calcium carbonate, and one of these which I have developed on a commercial basis is by the use of rolls. The rolls, conveniently two in number, conveniently positioned with their axes parallel, suitably in a horizontal plane, may in one embodiment be arranged so that they rotate in opposite directions, rotating toward each other on their top surfaces to create a nip into which the artificially prepared calcium carbonate may be fed and through which it may pass. The rolls may be made of any suitable material, such as wood, stone, plastic material, ceramic material or the like, or rolls faced with such material, but I prefer metal as it is cheaper and easier to fabricate. The rolls are usually made of a hard material, iron or steel being suitable, but, as will hereinafter be indicated, somewhat softer or more yielding rolls, or at least one or both rolls faced with such material, are better adapted for some purposes. Where a hard roll is to be used, a very hard surface roll is preferable, and this can be obtained by using a hard alloy or a metal, the surface of which may be hardened to an appreciable depth. Thus the rolls may be made of steel, various alloy steels, or cast iron, preferably chilled; the rolls may be "flame hardened"; or a Stellite surface or other hard surfacing material may be applied to the rolls. I have made tests with steel rolls having a hardness of 180-200 Brinell, but these proved to be relatively soft and to mark easily. Rather close grained cast iron rolls also mark, but apparently not quite so easily. Rolls having a Brinell hardness of 550-600 are much better, and metal of even a greater hardness is desirable if not too costly. A surfacing of Stellite No. 1 on steel rolls has worked well.

The rolls are conveniently arranged so that one has journals in fixedly positioned bearings while the other, conveniently the front one, has journals in moveable bearings upon which pressure may be exerted by any suitable means to force the latter roll toward the former. Any suitable source of pressure may be used, such as direct screw pressure, hydraulic pressure, spring pressure, lever pressure or the like, or a combination of one or more of these. The rolls, arranged in the above described embodiment, are fed from above into the nip and as they are revolved they deliver the calcium carbonate below. Suitable scrapers or doctors are provided on the rolls to assist in removing the pressed calcium carbonate from the surface of the rolls, and particularly to clean substantially the surface of the rolls so that no adhering material may cause trouble by returning to pass again through the nip of the rolls.

I have found that, in most cases, it is desirable to have rolls, particularly when hard surfaced rolls are used, ground as true as feasible, finished carefully, and to maintain them in their operation in this condition to avoid the formation of ridges, dents, and uneven places on the rolls. The rolls may be run at peripheral speeds which may be differential if desired, either in the same or in opposite directions. Or the rolls may be operated at equal peripheral speeds in opposite directions, conveniently so that they run toward one another on their top surfaces. The advantages and disadvantages of operation at differential and equal speeds, i. e., differential and equal peripheral speeds, will be pointed out later herein. The rolls may be driven independently by separate driving means, but it is usually more convenient to drive the roll having the fixedly positioned bearings, and to cause this roll to drive the second roll through appropriate gearing. The pair of rolls used may be of different diameters if desired, or may both be of the same diameters. The latter is usually a more convenient arrangement from a mechanical standpoint.

I have used in my tests a number of pairs of rotating rolls, positioned in cooperative relationship to one another, said pairs of rolls being of widely varied diameters, for example; a pair of ⅝" diameter rolls, a pair of 6" diameter rolls, and a pair of 20" diameter rolls. The pair of ⅝" diameter rolls were each 4" long, the pair of 6" diameter rolls were each 6" long, and the pair of 20" diameter rolls were each 3" long, that is to say, the "nip" or zone of compression of each pair was, respectively, 4", 6" and 3" long. In all tests reported herein, the rolls revolved toward each other in respect to their top surfaces.

I have found that the pressure exerted on the rolls, measured as pounds pressure per linear inch of nip, which is required to produce a given result, varies with the roll diameter. The pounds pressure per linear inch, i. e., per linear inch of nip, is the sum of the number of pounds pressure exerted on the two movable bearings of the roll which is so equipped, divided by the length of the nip in inches. I have not worked out an exact formula which correlates the pounds per linear inch of nip required to give a specific result with the diameter of the rolls used, but it would appear from numerous series of parallel tests I have made on the same or similar artificially prepared calcium carbonates on a pair of 6" diameter and a pair of 20" diameter rolls that the pressure required to obtain a given effect varies at least as much as proportionately to the roll diameters. For example, it requires apparently approximately three times the pressure per linear inch of nip on a pair of 20" diameter rolls as on a pair of 6" diameter rolls to give the same effect. This applies particularly where both the rolls of the pair are run at the same or substantially equal speeds toward one another.

My preliminary work was done with the pair of ⅝" diameter steel rolls, which were neither adapted to produce a very high pressure per linear inch nor equipped with apparatus for accurate measurement of the pressure exerted. Moreover, as will be apparent, these are of such small size that the quantity of material that can be passed through them in a reasonably short time is very small. However, even with these small rolls, with substantially the same speed on both rolls, starting with a dry artificially prepared calcium carbonate in powder form having an oil absorption of 59.5, I was able to produce by passing this between the rolls, with a moderate pressure exerted upon the rolls, calcium carbonate having an oil absorption of 36.4, and by increasing the pressure obtain calcium carbonate having as low an oil absorption as 29.1. Another sample of calcium carbonate similar to the first sample employed had an oil absorption originally of 50.7, and after passing between the rolls at approximately the same pressure as last indicated, had an oil absorption of 23.1. It was roughly estimated that the pressure required to produce the latter two results was in the neighborhood of approximately 250–350 lbs. per linear inch. Using approximately the same pressure per linear inch, results in the same general range were also obtained with coated similar calcium carbonate.

Based on these preliminary experiments, a roller mill with a pair of 6" diameter steel rolls was built, the rear roll having fixed and the front roll movable bearings, the axes of the rolls being disposed in a horizontal plane and being parallel to one another. A large number of trials were made with this mill in respect to method of operation, pressure requirements, power requirements, speed of operation, methods of feeding, equal and differential speed of rolls, and many other variables. I found that if the rolls were set so that, with no feed, they were allowed to press directly upon one another, particularly at high pressures per linear inch, that when the rolls were run with feed the roll surfaces tended to be marked and injured, and that the power requirements were excessive. I found, however, that if the bearings of the journals of the front and rear rolls were spaced apart from one another, so that the rolls, when there was no feed, just barely touched or better just didn't touch when pressure was applied to the bearings of the front roll, that damage to the roll surfaces and excess power requirements were substantially avoided when the rolls were run with feed. Sometimes a few thousandths of an inch greater spacing than this was found to be convenient, but the spacing should preferably not be so great as to prevent the full pressure being applied to the material passing between the rolls.

After a number of tests with various means of applying pressure to the bearings of the journals of the front roll, such as jack screws, springs and others, I adopted two hydraulic rams connected into the same hydraulic pressure line as the most convenient and easily regulated means. As the pressure rises sharply when material is fed to the rolls if there is no resilient member present to allow the rolls to move apart to compensate for the thickness of the feed at the nip, I found it convenient, especially at lower pressures, to interpose a spring of appropriate size between each ram and the corresponding front bearing. These springs, if chosen of the proper size, substantially prevent a pressure rise on feeding material between the rolls and also provide a safety device in operation in the event tramp metal or other hard material should accidently get into the feed.

The capacity of the springs required, particularly at high pressures per linear inch, becomes very great as the length of the rolls is increased, and I have used another device which serves the purpose of providing the desired resiliency and safety measure without resorting to excessively large springs. This device consists of an auxiliary hydraulic ram of relatively small diameter connected to the same hydraulic pressure line as the two rams operating against the front bearings. The small ram, owing to its much smaller area, operates against a proportionately smaller spring, and for any pressures per linear inch I have so far employed, functions very satisfactorily.

With this mill equipped with 6" diameter rolls, with hydraulic rams and springs (or without springs but with an auxiliary ram equipped with a spring) and an hydraulic pressure gauge, to apply, regulate and indicate the pressure, with the rolls operating at equal speeds, toward one another on their top surfaces, and with the bearings of the rolls so spaced that the rolls without feed just barely contacted, I have made a number of series of tests to determine the effect of pressure on artificially prepared calcium carbonate passing between the rolls. The pressure is expressed as pounds per linear inch of the nip of the rolls. One such illustrative series of tests is given in Table IX. The calcium carbonate used in this series was made by carbonation of an aqueous slurry of slaked lime with carbon dioxide. It was somewhat similar to, but of a different lot from, that of Tests No. 1 and 8 above. It was used in powder form in dry condition, and had an oil absorption of 53.0.

Table IX

| Test No. | Pressure, lbs. per linear inch on 6" diam. rolls (rolls operating at equal speeds) | Oil absorption |
|---|---|---|
| 45 | 0 | 53.0 |
| 46 | 100 | 39.9 |
| 47 | 200 | 38.3 |
| 48 | 500 | 35.9 |
| 49 | 1,000 | 28.8 |
| 50 | 2,000 | 24.9 |
| 51 | 3,000 | 22.7 |
| 52 | 4,000 | 20.4 |
| 53 | 5,000 | 19.8 |
| 54 | 10,000 | 16.8 |
| 55 | 15,000 | 15.0 |

A similar series of tests is given in Table X. This series was made on the same calcium carbonate the particles of which had, however, first been coated with 1% rosin in the manner which will be described later herein. It was tested in dry form as a powder.

Table X

| Test No. | Pressure, lbs. per linear inch on 6" diam. rolls (rolls operating at equal speeds) | Oil absorption |
|---|---|---|
| 56 | 0 | 50.8 |
| 57 | 100 | 35.0 |
| 58 | 200 | 28.6 |
| 59 | 500 | 26.7 |
| 60 | 1,000 | 21.3 |
| 61 | 2,000 | 18.1 |
| 62 | 3,000 | 15.6 |
| 63 | 4,000 | 14.3 |
| 64 | 5,000 | 14.6 |
| 65 | 10,000 | 14.2 |
| 66 | 15,000 | 14.5 |

While, from comparison of the above two tables, the general effect of passing between the rolls is seen to be similar whether coated or uncoated artificially prepared calcium carbonate is used, the actual magnitude of the effect seems to be somewhat greater on the coated material in this instance.

Other series of tests were made on the calcium carbonate in moist form. The same calcium carbonate as used in the series shown in Table IX, material of Test No. 45, was treated with water and thoroughly mixed until it was of uniform composition throughout. Analysis showed it to contain 84.1% of dry calcium carbonate. The coated calcium carbonate used in the series shown in Table X, material of Test No. 56, was similarly treated. It analyzed 85.4% dry solid content. Series of tests were run on these two materials with the results shown in Table XI.

Table XI

| Pressure, lbs. per linear inch on 6" diam. rolls (rolls operating at equal speeds) | Uncoated calcium carbonate, 84.1% dry | | Coated calcium carbonate, 85.4% dry | |
|---|---|---|---|---|
| | Test No. | Oil absorption | Test No. | Oil absorption |
| 0 | 45 | 53.0 | 56 | 50.8 |
| 100 | 67 | 50.0 | 77 | 32.4 |
| 200 | 68 | 40.2 | 78 | 30.5 |
| 500 | 69 | 34.5 | 79 | 26.4 |
| 1,000 | 70 | 28.1 | 80 | 24.2 |
| 2,000 | 71 | 23.2 | 81 | 22.5 |
| 3,000 | 72 | 22.0 | 82 | 20.2 |
| 4,000 | 73 | 21.7 | 83 | 19.4 |
| 5,000 | 74 | 20.9 | 84 | 19.1 |
| 10,000 | 75 | 18.0 | 85 | 17.7 |
| 15,000 | 76 | 17.7 | 86 | 17.3 |

It will be noted from a comparison of Tables IX, X and XI that the effect of pressure on the oil absorption test of the approximately 85% dry calcium carbonate used, whether coated or uncoated, is of the same general order of magnitude as that shown by the dry coated and uncoated calcium carbonate, although the dry materials, in parts of the pressure range, seem to be perhaps somewhat more affected by the pressure employed than do the 85% dry materials. It will also be noted that the uncoated and coated calcium carbonates, when 85% dry, show approximately the same relative differences as do the same calcium carbonates when run between the rolls in dry condition.

I have made a large number of other series of tests on artificially prepared calcium carbonate having a dry content intermediate between the dry material and the 85% dry material, and also having a dry content below 85%. Two such illustrative series are shown in Table XII, both using uncoated calcium carbonate, the same as that employed in the tests shown in Table IX, the material of Test No. 45. One of these series was run on calcium carbonate of 64.7% dry content, and the other on calcium carbonate of 59.7% dry content (the remainder, as before, being water).

Table XII

| Pressure, lbs. per linear inch on 6" diam. rolls (rolls operating at equal speeds) | Calcium carbonate 64.7% dry | | Calcium carbonate 59.7% dry | |
|---|---|---|---|---|
| | Test No. | Oil absorption | Test No. | Oil absorption |
| 0 | 45 | 53.0 | 45 | 53.0 |
| 100 | 87 | 37.9 | 93 | 34.3 |
| 200 | 88 | 38.4 | 94 | 32.4 |
| 500 | 89 | 35.2 | 95 | 28.6 |
| 750 | 90 | 30.8 | 96 | 28.2 |
| 1,000 | 91 | 30.7 | | |
| 1,500 | 92 | 27.5 | | |

It will be noted from the above table that while the range of pressures used in these two series is not so great as that employed in some of the previous series cited, nevertheless the general effect is seen to be along the same lines as previously shown, although the magnitude of the effect obtained may vary somewhat.

I have also made a number of series of tests on a roller mill having 20" diameter close grained cast iron rolls, constructed similarly to the 6"

diameter roller fill previously described herein, similarly equipped for applying, regulating and indicating pressures, with the rolls similarly operating at equal speeds, toward one another on their top surfaces, and with a bearing spacing similar to that used on the 6" diameter rolls. An illustrative series of tests made on the 20" diameter roller mill on a dry artificially prepared calcium carbonate in powder form is shown in Table XIII. This calcium carbonate was from a lot similar to that used in Test No. 45.

*Table XIII*

| Test No. | Pressure, lbs. per linear inch on 20" diam. rolls (rolls operating at equal speeds) | Oil absorption |
|---|---|---|
| 97 | 0 | 60.5 |
| 98 | 100 | 59.6 |
| 99 | 200 | 53.1 |
| 100 | 500 | 41.5 |
| 101 | 1,000 | 38.1 |
| 102 | 3,000 | 29.1 |
| 103 | 5,000 | 26.5 |
| 104 | 10,000 | 22.6 |

Two further illustrative series of tests run on the 20" mill, rather more extensive in their pressure range, are shown in Table XIV. The calcium carbonate used in one of the series, was similar to that employed in Tests No. 45 and 97, and, in the other, was calcium carbonate of this same nature coated with 1% rosin (in the manner to be described later herein), and similar to the calcium carbonate used in Test No. 56. The uncoated sample was run at 85.6% dry content and the coated sample at 85.2% dry content (the remainder, as before, being water).

*Table XIV*

| Pressure, lbs. per linear inch on 20" diam. rolls (rolls operating at the equal speeds) | Uncoated calcium carbonate 85.6% dry | | Coated calcium carbonate 85.2% dry | |
|---|---|---|---|---|
| | Test No. | Oil absorption | Test No. | Oil absorption |
| 0 | 105 | 54.6 | 118 | 56.0 |
| 100 | 106 | 46.0 | 119 | 47.8 |
| 200 | 107 | 43.9 | 120 | 41.9 |
| 500 | 108 | 39.1 | 121 | 32.3 |
| 1,000 | 109 | 33.2 | 122 | 28.1 |
| 2,000 | 110 | 29.5 | 123 | 26.3 |
| 3,000 | 111 | 28.7 | 124 | 25.3 |
| 4,000 | 112 | 24.3 | 125 | 25.4 |
| 5,000 | 113 | 22.9 | 126 | 21.8 |
| 10,000 | 114 | 21.8 | 127 | 21.7 |
| 15,000 | 115 | 22.5 | 128 | 21.4 |
| 20,000 | 116 | 21.9 | 129 | 19.2 |
| 25,000 | 117 | 21.4 | 130 | 20.8 |

As indicated above, the data in Tables IX, X and XI were obtained on 6" diameter rolls while the data in Tables XIII and XIV were obtained on 20" diameter rolls. A comparison, particularly in the intermediate pressure ranges, of the oil absorption figures in Table IX with the oil absorption figures of similar magnitude in Table XIII, and those in Table XI with those of similar magnitude in Table XIV, tends to substantiate the general approximation previously stated herein, that, on the same or similar calcium carbonate, to obtain an oil absorption on 20" diameter rolls smilar to that on 6" diameter rolls requires approximately three times or more as much pressure per linear inch, at least in the intermediate ranges, i. e., the pressure per linear inch required is roughly proportional to the diameters of the rolls.

As indicated above, the data in Tables IX–XIV inclusive was obtained on pairs of equal speed rolls, running toward each other in respect to their top surfaces. To show the effect of passing artificially prepared calcium carbonate between rolls running at speeds differential in respect to one another, I cite the illustrative data compiled in Table XV below. The same mill with 6" diameter rolls as previously described was used for these tests, but in this case other gears were used on the roll journals so that the speed of one of the rolls was 1.4 times the speed of the other, the rolls however still continuing to revolve toward one another in respect to their top surfaces. Naturally any other differential speeds desired may be used, the one cited being merely illustrative. The bearings of the front and rear rolls were so spaced apart, that, under each given pressure employed, the roll surfaces at the nip, without feed, were approximately .002" apart to avoid any possibility of contact, and thus of abrading one another. The illustrative data shown consist of four series of tests made respectively on dry uncoated calcium carbonate; dry calcium carbonate coated with 1% rosin; uncoated calcium carbonate 84.1% dry; and calcium carbonate coated with 1% rosin, 85.4% dry. The calcuim carbonate used in each series was the same as that used in the corresponding series shown in Tables IX, X and XI respectively.

*Table XV*

| Pressure, lbs. per linear inch on 6" diam. rolls (run at differential speeds of 1:1.4) | Uncoated calcium carbonate dry | | Coated calcium carbonate dry | | Uncoated calcium carbonate 84.1% dry | | Coated calcium carbonate 85.4% dry | |
|---|---|---|---|---|---|---|---|---|
| | Test No. | Oil absorption | Test No. | Oil absorption | Test No. | Oil absorption | Test No. | Oil absorption |
| 0 | 45 | 53.0 | 56 | 50.8 | 45 | 53.0 | 56 | 50.8 |
| 50 | 131 | 38.2 | 140 | 38.1 | 149 | 37.9 | 157 | 33.4 |
| 100 | 132 | 38.4 | 141 | 27.5 | 150 | 28.7 | 158 | 26.6 |
| 200 | 133 | 32.3 | 142 | 24.7 | 151 | 26.4 | 159 | 21.0 |
| 500 | 134 | 28.7 | 143 | 20.3 | 152 | 21.5 | 160 | 18.6 |
| 1,000 | 135 | 22.7 | 144 | 20.9 | 153 | 20.0 | 161 | 19.2 |
| 3,000 | 136 | 22.1 | 145 | 17.9 | 154 | 19.3 | 162 | 17.9 |
| 5,000 | 137 | 21.6 | 146 | 20.1 | 155 | 19.7 | 163 | 18.2 |
| 10,000 | 138 | 17.1 | 147 | 18.2 | 156 | 18.4 | 164 | 18.8 |
| 15,000 | 139 | 18.2 | 148 | 18.2 | | | | |

For convenience in comparing the series of data in Table XV with the corresponding series of data in Tables IX, X and XI respectively, Tables XVI and XVII are presented, Table XVI being a combination of the data given in Tables IX, X and most of the data in the first two data (oil absorption) columns of Table XV; and Table XVII being a combination of the data given in Table XI and most of the data in the last two data (oil absorption) columns of Table XV.

Table XVI

| Pressure, lbs. per linear inch on 6" diam. rolls | Uncoated calcium carbonate, dry | | | | Coated calcium carbonate, dry | | | |
|---|---|---|---|---|---|---|---|---|
| | Rolls run at equal speeds | | Rolls run at differential speeds | | Rolls run at equal speeds | | Rolls run at differential speeds | |
| | Test No. | Oil absorption | Test No. | Oil absorption | Test No. | Oil absorption | Test No. | Oil absorption |
| 0 | 45 | 53.0 | 45 | 53.0 | 56 | 50.8 | 56 | 50.8 |
| 100 | 46 | 39.9 | 132 | 38.4 | 57 | 35.0 | 141 | 27.5 |
| 200 | 47 | 38.3 | 133 | 32.3 | 58 | 28.6 | 142 | 24.7 |
| 500 | 48 | 35.9 | 134 | 28.7 | 59 | 26.7 | 143 | 20.3 |
| 1,000 | 49 | 28.8 | 135 | 22.7 | 60 | 21.3 | 144 | 20.9 |
| 3,000 | 51 | 22.7 | 136 | 22.1 | 62 | 15.6 | 145 | 17.9 |
| 5,000 | 53 | 19.8 | 137 | 21.6 | 64 | 14.6 | 146 | 20.1 |
| 10,000 | 54 | 16.8 | 138 | 17.1 | 65 | 14.2 | 147 | 18.2 |
| 15,000 | 55 | 15.0 | 139 | 18.2 | 66 | 14.5 | 148 | 18.2 |

Table XVII

| Pressure, lbs. per linear inch on 6" diam. rolls | Uncoated calcium carbonate, 84.1% dry | | | | Coated calcium carbonate, 85.4% dry | | | |
|---|---|---|---|---|---|---|---|---|
| | Rolls run at equal speeds | | Rolls run at differential speeds | | Rolls run at equal speeds | | Rolls run at differential speeds | |
| | Test No. | Oil absorption | Test No. | Oil absorption | Test No. | Oil absorption | Test No. | Oil absorption |
| 0 | 45 | 53.0 | 45 | 53.0 | 56 | 50.8 | 56 | 50.8 |
| 100 | 67 | 50.0 | 150 | 28.7 | 77 | 32.4 | 158 | 26.6 |
| 200 | 68 | 40.2 | 151 | 26.5 | 78 | 30.5 | 159 | 21.0 |
| 500 | 69 | 34.5 | 152 | 21.4 | 79 | 26.4 | 160 | 18.6 |
| 1,000 | 70 | 28.1 | 153 | 20.0 | 80 | 24.2 | 161 | 19.2 |
| 3,000 | 72 | 22.0 | 154 | 19.3 | 82 | 20.2 | 162 | 17.9 |
| 5,000 | 74 | 20.9 | 155 | 19.7 | 84 | 19.1 | 163 | 18.2 |
| 10,000 | 75 | 18.0 | 156 | 18.4 | 85 | 17.7 | 164 | 18.8 |
| 15,000 | 76 | 17.7 | | | 86 | 17.3 | | |

An examination of Tables XVI and XVII indicates that in the lower ranges of pressure per linear inch up to approximately 1,000 to 5,000 lbs. according to the particular calcium carbonate series (i. e., uncoated or coated, dry or moist) which are compared, differential speed rolls give results, as measured by reduction of oil absorption, superior to those obtained with equal speed rolls, but that in the higher pressure per linear inch ranges, above from approximately 1,000 to 5,000 lbs. or therebetween as the case may be in any given series, the differential speed rolls give results in some cases approximately the same, but in most cases somewhat poorer. These particular ranges apply to 6" diameter rolls, and are of course merely illustrative. Naturally for rolls of other diameters, other ranges may apply. It may be noted here that in the tests recorded in Tables XVI and XVII, the speed of the equal speed rolls was greater than the speed at which the higher speed roll of the differential rolls was run, but, as will be pointed out later herein, inasmuch as the oil absorption obtained is substantially independent of the speed of the rolls when the bearings of the rolls are spaced as they were in the series of tests recorded in said tables, this difference in speed does not affect the validity of the conclusions which have been drawn from the data in said tables.

I have shown previously herein the effect of diameter of rolls in respect to the pressure per linear inch required to reduce the oil absorption of certain calcium carbonates to a given point, the pressure per linear inch required being in general, roughly speaking, approximately proportional to the diameter of the rolls. The necessity for the employment of such proportionately higher pressure in the use of larger diameter rolls is thus a disadvantage thereof. However this is offset in many cases by a very important advantage which I have found to be inherent in larger diameter rolls, namely, the very much greater yield obtained by their use. This is illustrated in Table XVIII which shows the yield in lbs. per day, dry basis, per linear inch of nip on similar samples of artificially prepared calcium carbonate run on the 6" diameter rolls and 20" diameter rolls respectively, the rolls of each pair being run at equal speeds in each case, and the peripheral speed of the 6" rolls and 20" rolls being the same.

The moisture content of the moist calcium carbonate used on the two sets of rolls was only slightly different, that on the 6" rolls being 84.1% dry, and that on the 20" rolls being 85.6% dry.

*Table XVIII*

| Pressure, lbs. per linear inch on rolls | Yield, lbs. per day per linear inch of nip | | | | Yield, lbs. per day per linear inch of nip | | | |
|---|---|---|---|---|---|---|---|---|
| | Uncoated calcium carbonate, dry | | | | Uncoated calcium carbonate, moist | | | |
| | 6" rolls | | 20" rolls | | 6" rolls | | 20" rolls | |
| | Test No. | Lbs. | Test No. | Lbs. | Test No. | Lbs. | Test No. | Lbs. |
| 100 | 46 | 391 | 98 | 768 | 67 | 801 | 106 | 1,585 |
| 200 | 47 | 403 | 99 | 860 | 68 | 846 | 107 | 2,278 |
| 500 | 48 | 347 | 100 | 877 | 69 | 792 | 108 | 2,247 |
| 1,000 | 49 | 300 | 101 | 621 | 70 | 743 | 109 | 2,393 |
| 2,000 | 50 | 283 | | | 71 | 698 | 110 | 2,028 |
| 3,000 | 51 | 275 | 102 | 501 | 72 | 720 | 111 | 1,839 |
| 4,000 | 52 | 251 | | | 73 | 706 | 112 | 1,885 |
| 5,000 | 53 | 247 | 103 | 472 | 74 | 649 | 113 | 2,013 |
| 10,000 | 54 | 257 | 104 | 605 | 75 | 382 | 114 | 1,967 |
| 15,000 | 55 | 270 | | | 76 | 267 | 115 | 1,839 |
| 20,000 | | | | | | | 116 | 1,939 |
| 25,000 | | | | | | | 117 | 1,873 |

An examination of this data indicates that, at the same pressure per linear inch, the yield with the 20" diameter equal speed rolls is approximately twice as great for the dry calcium carbonate, and two to three times as great for the moist calcium carbonate, as that obtained with the 6" diameter equal speed rolls, except in the case of the moist calcium carbonate at the highest pressures per linear inch, where the yield on the 6" rolls drops sharply, and in the latter case the yield on the 20" rolls is some five or six times as great as on the 6" rolls. However, a more useful comparison is that between the yield of the 6" and 20" rolls at that pressure per linear inch on each at which an equivalent effect is obtained, i. e., roughly three times the pressure per linear inch on the 20" rolls as that exerted on the 6" rolls. There are not many direct comparisons that can be made among the above figures on that basis, but by using these few cases, and interpolating for the others, it is seen that, on this basis of comparison, which is the practical basis, the yield on the 20" rolls is approximately twice or a little less than that on the 6" rolls for the dry calcium carbonate, and two to three times that on the 6" rolls for the moist calcium carbonate. This, it is seen, actually differs but little from the first basis of comparison.

A similar situation obtains in respect to the comparative yields on 6" and 20" rolls when coated calcium carbonate is used, but in this case the ratio is in general somewhat more pronounced in favor of the 20" rolls. This is illustrated by the data of Table XIX which lists the yields on two series of tests run under the same conditions as those under which the data of Table XVIII was obtained. The coated artificially prepared calcium carbonate run on the 6" rolls was 85.4% dry and that on the 20" rolls 85.2% dry. The yields shown here are three to four times as great on the 20" rolls as on the 6" rolls for the same pressure per linear inch of nip, and approximately the same ratio obtains for the yields, at the pressure per linear inch on each pair of rolls giving the same effect. The yields, as before, are on the dry basis.

*Table XIX*

| Pressure, lbs. per linear inch on roll | Yield, lbs. per day per linear inch of nip, coated calcium carbonate, moist, 6" rolls | | Yield, lbs. per day per linear inch of nip, coated calcium carbonate, moist, 20" rolls | |
|---|---|---|---|---|
| | Test No. | Lbs. | Test No. | Lbs. |
| 100 | 77 | 159 | 119 | 603 |
| 200 | 78 | 177 | 120 | 565 |
| 500 | 79 | 179 | 121 | 656 |
| 1,000 | 80 | 176 | 122 | 643 |
| 2,000 | 81 | 170 | 123 | 600 |
| 3,000 | 82 | 161 | 124 | 527 |
| 4,000 | 83 | 155 | | |
| 5,000 | 84 | 142 | 126 | 564 |
| 10,000 | 85 | 140 | 127 | 610 |
| 15,000 | 86 | 139 | 128 | 543 |
| 20,000 | | | 129 | 524 |
| 25,000 | | | 130 | 582 |

In addition to the increased yield per linear inch of nip obtained by the use of larger diameter rolls, there is another important factor which favors their use, and that is that they consume less power per unit of calcium carbonate of a given oil absorption which they produce. For example, in certain instances, I have found the power requirement per unit of yield to be three to four times as much on the 6" diameter rolls as on the 20" diameter rolls. These figures naturally vary with the particular calcium carbonate used and the other conditions of running, but in all cases so far tested the larger diameter rolls appear to be substantially more economical in power consumption than do the smaller diameter rolls.

Thus from the standpoint of higher yield and lower power consumption, I prefer to use larger diameter rolls, although as stated these require higher pressures per linear inch to obtain the same results, as measured by oil absorption tests.

I have shown in Tables XVIII and XIX the yields obtained on equal speed rolls. The yields obtained on rolls run at differential speeds are illustrated in Tables XX and XXI which show respectively, the yields on the same samples of uncoated and coated artificially prepared calcium carbonate run on 6" diameter rolls at equal speeds and differential speeds. The speed of the equal speed rolls was higher than that of the higher speed differential roll, but inasmuch as running the differential speed rolls at higher speeds did not materially increase their yield, it is believed that valid conclusions as to yields on the equal and differential speed rolls can be drawn from a comparison of the series of data presented in Tables XX and XXI. The yields are on the dry basis.

*Table XX*

| Pressure, lbs. per linear inch on 6" diam. rolls | Yield, lbs. per day per linear inch of nip, uncoated calcium carbonate, dry | | | | Yield, lbs. per day per linear inch of nip, uncoated calcium carbonate, 84.1% dry | | | |
|---|---|---|---|---|---|---|---|---|
| | Rolls run at equal speeds | | Rolls run at differential speeds | | Rolls run at equal speeds | | Rolls run at differential speeds | |
| | Test No. | Lbs. | Test No. | Lbs. | Test No. | Lbs. | Test No. | Lbs. |
| 100 | 46 | 391 | 132 | 170 | 67 | 801 | 150 | 377 |
| 200 | 47 | 403 | 133 | 178 | 68 | 846 | 151 | 371 |
| 500 | 48 | 347 | 134 | 155 | 69 | 792 | 152 | 363 |
| 1,000 | 49 | 300 | 135 | 151 | 70 | 743 | 153 | 321 |
| 3,000 | 51 | 275 | 136 | 137 | 72 | 720 | 154 | 308 |
| 5,000 | 53 | 247 | 137 | 128 | 74 | 649 | 155 | 353 |
| 10,000 | 54 | 257 | 138 | 110 | 75 | 382 | 156 | 298 |
| 15,000 | 55 | 270 | 139 | | 76 | 267 | | |

Table XXI

| Pressure, lbs. per linear inch on 6" diam. rolls | Yield, lbs. per day per linear inch of nip, coated calcium carbonate, dry | | | | Yield, lbs. per day per linear inch of nip, coated calcium carbonate, 85.4% dry | | | |
|---|---|---|---|---|---|---|---|---|
| | Rolls run at equal speeds | | Rolls run at differential speeds | | Rolls run at equal speeds | | Rolls run at differential speeds | |
| | Test No. | Lbs. | Test No. | Lbs. | Test No. | Lbs. | Test No. | Lbs. |
| 100 | 57 | 62 | 141 | 11 | 77 | 159 | 158 | 113 |
| 200 | 58 | 61 | 142 | 15 | 78 | 177 | 159 | 121 |
| 500 | 59 | 66 | 143 | 16 | 79 | 179 | 160 | 78 |
| 1,000 | 60 | 58 | 144 | 15 | 80 | 176 | 161 | 91 |
| 3,000 | 62 | 53 | 145 | 15 | 82 | 161 | 162 | 53 |
| 5,000 | 64 | 46 | 146 | 14 | 84 | 142 | 163 | 67 |
| 10,000 | 65 | 59 | 147 | 17 | 85 | 140 | 164 | 90 |
| 15,000 | 66 | 62 | 148 | 18 | 86 | 139 | | |

From these tables it is seen that in the case of the uncoated calcium carbonate, whether dry or moist, the yield of the equal speed rolls is in most cases about twice as great as that of the differential speed rolls, with the illustrative speed ratio of 1:1.4, while with the dry coated calcium carbonate it runs about four times, and with the moist coated calcium carbonate it runs approximately twice as great.

From the comparisons so far presented herein, it is seen that the differential speed rolls seem to have the advantage, at least in certain parts of the pressure per linear inch range, of requiring less pressure to produce a given result than do the equal speed rolls. However, the differential speed rolls have the disadvantage of producing a lower yield. Other disadvantages are a higher power consumption in certain cases, and in certain other cases, especially in the higher pressure per linear inch ranges, the tendency toward discoloration of the calcium carbonate, probably due to abrasion of the roll surfaces. Another disadvantage, particularly when used on coated calcium carbonate, either dry or moist, is the excessive amount of "powder" produced. This particular matter will be discussed later below.

It is thus seen that although rolls run at differential speeds may be satisfactorily used, and may even, in certain cases be preferred, in most cases the equal speed rolls seem to offer greater advantages, all factors considered. It should be noted that the equal speed rolls obtain their effect by pressure alone, with probably a substantial absence of, or at most only a very minor degree of, attrition, while in the differential speed rolls, the pressing action of the rolls is accompanied by a definite attriting action, the greater the differential ratio of the speeds of the two rolls, doubtless the greater the attrition. It is to be noted, however, that the application of any attriting action is only of momentary duration. For example with 6" diameter rolls, which have circumferences of approximately 19", assuming for the sake of calculation a contact width in the nip in which any substantial attrition takes place of ½" (which is probably larger than is actually the case), then the attriting action on any given particle of calcium carbonate treated would be at most only about 1/38 of a total revolution. Assuming a speed of one revolution a minute for the slow speed roll, which is normally excessively slow for 6" diameter rolls in commercial operation, then the time during which the attriting action takes place would only be approximately 1.5 seconds. Under any conditions feasible in practice, the time would probably never be over 15 seconds, which would be based on an assumed speed of only about one tenth of a revolution per minute on the slower roll of the 6" diameter rolls, very much slower than it would be economically feasible to run such rolls, and in most cases the time would be much less than 1.5 seconds, usually being only a small fraction of a second. For example, if the speed of the lower speed 6" diameter roll were eight revolutions per minute, the time of attrition would be only about 0.2 second.

Thus apart from any consideration of the conjoint use of pressure with such momentary attrition, the fact that such attrition is of momentary duration, clearly differentiates the use of differential speed rolls from any prior art practice, where, in order to reduce the oil absorption of calcium carbonate, calcium carbonate was subjected to prolonged attrition, i. e., for a length of time of an entirely different order of magnitude, one far in excess of the possible extreme maximum time of 15 secs. which might feasibly be employed in my process, and still far more greatly in excess of the time of a fraction of a second normally employed in my process, the time employed in such prior art practice usually being a matter of hours.

There are several other variables in connection with the operation of rolls which, although they have been mentioned or treated in part in the foregoing, I shall now consider further. These variables are more or less interdependent among themselves and the other variables heretofore discussed.

The first of these is the effect of the speed at which the rolls are operated. I have so far tried speeds, with rolls running at equal speeds, of from 1.75 revolutions per minute up to 57 revolutions per minute with the 6" diameter rolls, and from 2 R. P. M. up to 42 R. P. M. with the 20" diameter rolls. With the differential speed rolls, I have tried speeds from 2 R. P. M. up to 28 R. P. M. on the higher speed roll, using the 6" diameter rolls. Of course the peripheral speed of the 20" diameter rolls is over three times that of the 6" diameter rolls at any given R. P. M., and in any comparison of the performance of pairs of different diameter rolls, it is probable that the performances at equal peripheral speeds rather than at equal speeds in R. P. M. provide the better basis. Except for data on which the speed of the rolls has a minor effect, it is rather difficult to compare performances on the differential speed rolls with those on the equal speed rolls because of the fact that two different speeds are employed on the differential rolls, either of which might be chosen as the basis for comparison.

I have found that substantially the same effect, as measured by reduction of oil absorption, is obtained with the same sample of calcium carbonate when employing the same pressure per linear inch on any given pair of rolls, regardless of the speed of the rolls. This is the case with the equal speed rolls when the bearings are so spaced that the rolls without feed, under pressure, just barely touch or just barely do not touch one another, and with the differential speed rolls when the rolls just do not touch one another. If, however, the rolls are adjusted so that they are kept a distance from one another when under pressure, by placing spacers between the bearings of the journals of the front and rear rolls, that is, so that there is an appreciable gap between the two rolls at the nip when without feed and under pressure, for example a gap of .010", then the oil absorption obtained is lower at low speeds than that obtained at high speeds. In other words, results as to oil absorption obtained using such a gap are not so good at high speeds as at low speeds.

It might be anticipated that the yield obtained with the rolls at any given speed would be proportional to the speed, but I have found that this is not the case as the yield of the rolls increases far less than proportionately to the speed as the speed increases, and in some cases beyond a certain speed there seems to be no substantial increase in yield with further increase of speed, and in other cases only a relatively slight increase in yield, usually considerably less than proportionate to the increase in speed. This is shown in Table XXII which presents two illustrative series of tests on which the yield was determined at different roll speeds, using equal speed rolls, in one case 6" diameter rolls and in the other case 20" diameter rolls. The calcium carbonate used for these tests was made by the reaction of carbon dioxide on an aqueous slurry of slaked lime, and coated with 1% rosin. The yield is given on the dry basis.

*Table XXII*

| 6" equal speed rolls, coated calcium carbonate 79.6% dry | | | 20" equal speed rolls, coated calcium carbonate 88.8% dry | | |
|---|---|---|---|---|---|
| R. P. M. | Test No. | Yield, lbs. per linear inch of nip | R. P. M. | Test No. | Yield, lbs. per linear inch of nip |
| 15.4 | 165 | 232 | 2.2 | 174 | 456 |
| 22.3 | 166 | 255 | 4.6 | 175 | 522 |
| 25.8 | 167 | 263 | 8.3 | 176 | 590 |
| 31.5 | 168 | 291 | 15.3 | 177 | 603 |
| 35.8 | 169 | 286 | 22.3 | 178 | 685 |
| 41.5 | 170 | 306 | 31.8 | 179 | 823 |
| 45.5 | 171 | 319 | 41.8 | 180 | 810 |
| 48.5 | 172 | 348 | | | |
| 57 | 173 | 369 | | | |

With differential speed rolls, at the speeds so far tried, the same general tendencies in respect to speed on yield have been observed as with equal speed rolls.

Another question of some importance to be considered in respect to its relation to speed of rolls is the matter of "powder" which I have heretofore referred to briefly herein. I have found that while the artificially prepared calcium carbonate when passed through the rolls is pressed into a chip form, that is, when there is employed calcium carbonate which is dry or moderately moist, for example up to about 20% moisture content, there usually is additionally present in conjunction with the chips more or less powder which may be sieved out from the chips by use of a screen, conveniently a coarse mesh such for example as a 40 mesh sieve. Apparently this powder, in most cases at any rate, appears to be reduced in oil absorption by its passage between the rolls but very little compared with the reduction in oil absorption shown by the calcium carbonate in the chip form. I have been unable as yet with certainty to account for the presence of this powder, but one possible explanation is that it may have gone through the nip in the interstices between sections of the nip where the nip happened to seize larger amounts of feed, which thus were compressed, leaving smaller amounts of the feed subjected to comparatively little pressure in the spaces in between. This explanation, however, does not appear entirely satisfactory because there are cases where the entire feed can be seen coming through the nip apparently as a continuous sheet, later breaking up into chips, with the entire product still containing an appreciable percentage of high oil absorption powder in addition to the low oil absorption chips. The powder does not appear to be formed from the breaking up of the chips because when the chips are pulverized, there is usually little or no difference between the oil absorption of the chips and that powder resulting from their pulverization. Another explanation may be that the presence of the powder has some connection with the use of spur gearing to drive the rolls, because of possible lack of absolute continuity of application of power inherent in spur gearing. But whatever may be the true explanation, and the above explanations are offered purely as tentative ones and may or may not prove ultimately to be the correct explanations, the fact is, as stated, that there is in many cases powder present in the product passing through the rolls in varying amounts according to conditions.

The amount of powder present in the product passed between the rolls varies greatly with conditions. Other things being equal, the uncoated calcium carbonate seems to give less powder than coated calcium carbonate, and dry calcium carbonate, whether coated or uncoated, seems to give more powder than moist calcium carbonate, while the amount of powder apparently decreases with increase of moisture present. The powder in most cases seems to increase substantially in percentage present in the total product passing between the rolls with increase in speed of the rolls, and naturally the greater the percentage of powder present, the less proportionately of the product will be yield, the yield being the substantially powder free product. The percentage of powder also, other things being equal, seems to be in many cases of a similar order of magnitude for the 6" diameter rolls and 20" diameter rolls when comparison is made at the same peripheral speeds. At any given speed, the effect of increase in pressure per linear inch has so far been found to give results which are not consistent in respect to percentage of powder produced. In some series the increase in pressure has little effect, in some it has a large effect, the percentage of powder being usually, but not always, higher for the lower pressures. The differential speed rolls appear to give percentages of powder of similar order of magnitude to those obtained on equal speed rolls in the case of the dry or moist uncoated calcium carbonate, but considerably higher in the case of the dry or moist coated calcium carbonate. Also the increase of percent powder in certain cases seems to be greater with increase of speed. However the bearing of the factors discussed on the percentage of powder formation are merely to be considered as tendencies, as the data on powder percentages so far obtained have been rather erratic and permit only of such general statements as have been made.

As illustrative of actual percentages of powder which have been obtained in certain cases with uncoated and coated calcium carbonate, both dry and moist, on equal speed 6" and 20" diameter rolls, at approximately equal peripheral speeds (28.5 and 8.3 R. P. M. respectively), and at approximately equivalent pressures per linear inch of nip (1000 and 3000 lbs. respectively), the data in Table XXIII are submitted. As will be noted, these data were obtained in some of the tests previously cited in other connections herein.

Table XXIII

| Material | Diameter, equal speed rolls | Test No. | Percent powder |
|---|---|---|---|
| | Inches | | |
| Uncoated calcium carbonate, dry | 6 | 49 | 16.0 |
| Do | 20 | 102 | 27.6 |
| Coated calcium carbonate, dry | 6 | 60 | 56.7 |
| Do | 20 | (¹) | (¹) |
| Uncoated calcium carbonate 84.1% dry | 6 | 70 | 2.5 |
| Uncoated calcium carbonate 85.6% dry | 20 | 111 | 9.2 |
| Coated calcium carbonate 85.4% dry | 6 | 80 | 24.8 |
| Coated calcium carbonate 85.2% dry | 20 | 124 | 27.7 |

¹ This test not made.

As illustrative of the variation in percent powder with variation in speed of the rolls, the series of data in Table XXIV are submitted:

Table XXIV

| 6" equal speed rolls | | | | 20" equal speed rolls | | |
|---|---|---|---|---|---|---|
| | Coated calcium carbonate | | | | Coated calcium carbonate 88.8% dry | |
| R. P. M. | 79.6% dry | | 92.4% dry | R. P. M. | | |
| | Test No. | Percent powder | Test No. | Percent powder | | Test No. | Percent powder |
| 15.4 | 165 | 3.2 | | | 2.2 | 174 | 11.6 |
| 22.3 | 166 | 5.6 | | | 4.6 | 175 | 11.8 |
| 25.8 | 167 | 11.1 | 181 | 20.3 | 8.3 | 176 | 21.7 |
| 31.5 | 168 | 13.0 | | | 15.3 | 177 | 23.2 |
| 35.8 | 169 | 13.6 | 182 | 23.6 | 22.3 | 178 | 28.7 |
| 41.5 | 170 | 17.3 | | | 31.8 | 179 | 32.4 |
| 45.5 | 171 | 18.? | 183 | 27.5 | 41.8 | 180 | 34.8 |
| 48.5 | 172 | 16.2 | | | | | |
| 57 | 173 | 18.1 | 184 | 30.8 | | | |

It will be seen that the percent powder may be low, moderate or high according to conditions, and as it increases rather rapidly with increased speed, operation of the rolls at the lower speeds naturally reduces the percentage of powder produced.

Another factor favoring the operation of the rolls at lower speeds is the fact that power requirements appear to increase rather markedly with increase of speed, and thus it becomes more economical to operate at lower speeds, for at such speeds the power requirement per unit of yield appears to be smaller. In most cases this increase in power requirement with increase of speed seems to be even more pronounced with differential speed rolls than with equal speed rolls, so the tendency is to run differential speed rolls at even lower speeds than the equal speed rolls of same diameter.

The data on percent powder given above were obtained with spur gears driving the rolls. It appears to be indicated that the more nearly substantially continuous application of power inherent in herringbone gearing favorably influences, i. e., decreases the percentage of powder, and thus I prefer to use herringbone gearing not only on the shafts of the rolls themselves, but for transmitting the power from the power source to the rolls.

I have discussed the question of yield previously herein in connection with several matters, such as the effect thereon of roll diameter, of equal and differential speed rolls, and of the speed of the rolls. As stated, the larger the roll diameter the greater appears to be the yield. This seems to be due to the fact that the larger roll diameters give a more acute angle at the nip than do the smaller roll diameters, which seems to result in the larger diameter rolls gripping the feed better, thus improving the yield. The effect of the other matters have been considered just above. As also may be noted from the data submitted herein, uncoated calcium carbonate gives a much higher yield than coated calcium carbonate, and moist calcium carbonate, whether coated or uncoated, gives a much higher yield than does the corresponding dry calcium carbonate.

I have tried many ways of increasing the yield, particularly in relation to the method of feed, for example by controlling the width of the flow of feed into the nip by feeding the calcium carbonate between parallel plates just above and lengthwise of the nip. In one series of tests on 6" diameter rolls, the variation by small increments from a "sheet" of feed from ⅛" wide up to 3" wide, did not seem to change the yield materially, providing there was maintained an adequate amount of feed in the nip from the feeding device of the width used. However, there appears to be little advantage in feeding in a thin sheet, and I have found that it is, in general, desirable to maintain the feed in the nip to a substantial height, for example half way up from the nip to the top of the rolls, because in certain cases where the nip is not fed in adequate quantity, the amount of feed taken into the nip has been found to be less than that amount which the nip would otherwise take in. The nip may be fed, and maintained at a given level, by a suitable feeding device, such as a Jeffrey-Traylor feeder; or, conveniently, a hopper of a width about the diameter of the rolls used may be arranged directly above the nip and extending into the nip at its ends, equipped with a vibrator, such as of the "Syntron" type, to prevent arching of the feed in the hopper.

Prepressing or prerolling or precompacting the feed will in some cases increase the yield and this practice may be employed if desired, but this is usually not employed as it is somewhat costly because another or at least related operation is required. I have also found that the yield appears to be greater when the rolls are cold or cool than when they are warm or hot, and thus I prefer, from the point of view of greater yield, to cool the rolls while operating, conveniently internally by water.

The yield seems to be increased in certain cases when the feed is in little lumps or clusters of particles, or granules, rather than in the form of impalpable powder. For example, lump dry calcium carbonate or moist calcium carbonate which has been forced through small openings in a perforated plate, for example 1/16" openings, appears to feed somewhat better than do powders and thus gives a higher yield. This is particularly so in the case of the coated calcium carbonate, especially when moist. Naturally any device or expedient to increase the feed of the rolls is advantageous because that permits more production in a given time from a given pair of rolls. Any device for increasing the pressure on the feed may be useful for increasing the yield, e. g., a closed hopper over the nip with a force screw feed into one side of the hopper.

An expedient which I have found to be very effective for increasing the yield from 10 to 40% or even more in various cases is the moistening of the rolls, preferably with water, prior to their coming in contact with the calcium carbonate in the nip, that is, applying a film of water to the outside, i. e., the rising surface, of the rolls. The water may be suitably applied by troughs or contact rolls or the like, but I have found that any device which actually comes in contact with the surface of the rolls gradually becomes fouled with the film of the material which is usually carried around the rolls, and thus is apt to be a source of trouble. A better way is to spray the rolls with water either by a rapidly revolving brush which preferably does not touch the rolls, or more conveniently with one or more spray nozzles of suitable capacity. A misting type of nozzle is especially suitable for this purpose.

I have found that it is desirable to wet the rolls thoroughly so that a heavy film of water is provided thereon, that is, preferably enough water so that the excess runs back on the outside surfaces of the rolls and can be appropriately drained off below. I have found that the use of less than this amount of water usually does not give the maximum increase in yield obtainable by this method. This procedure of wetting the rolls is suitable for use when operating on either moist or dry calcium carbonate, either coated or uncoated. Only relatively little water by weight on the weight of the calcium carbonate is taken up, the increase in moisture content of the calcium carbonate passing between the rolls sometimes being as little as .2 to .5% and usually not over 2% where moist calcium carbonate is used, but possibly somewhat more in certain cases where dry calcium carbonate is used.

For operating convenience I prefer not to wet the surface of the rolls all the way to their outer edges because sludge-like calcium carbonate is apt to form and exude edgewise over the end of the nip, and cause fouling of the rolls. I find by confining the application of the water to the surface of the rolls, say from ½ to ¾", or more in some cases, from the ends of the rolls, the outer end of the roll surface is thus kept substantially dry and fouling is substantially prevented. The power requirements when operating with wetted rolls are somewhat higher than when this expedient is not used, but usually proportionately less than the increase in yield obtained. In most cases wetting the rolls appears to reduce the percentage of powder produced.

I have stated that the calcium carbonate normally comes through the nip in the form of a thin chip. The thickness of this chip is affected by many variables, among the more important ones of which are: the variety of the artificially prepared calcium carbonate used, whether equal or differential speed rolls are used, the diameter of the rolls used, the pressure per linear inch of nip employed, speed of the rolls, whether the calcium carbonate is coated or uncoated, and whether it is dry or moist. While I speak of calcium carbonate passing between the rolls as a chip, actually in some cases, particularly at low speeds, the material is delivered from the nip of the rolls as a sheet hanging straight down from the center of the nip, which subsequently breaks up into chips. In other cases the sheet coming through the nip clings to one or both of the rolls and is removed by the doctors or scrapers contacting the rolls below the nip, in the form of chips. In the case of differential speed rolls, if the conditions are such as to form a continuous sheet or coating of the product on the roll, it is usually the higher speed roll which is thus coated, the coating being removed by the doctor or scraper in the form of chips. Chips vary widely in thickness according to conditions. Some illustrative examples of the thickness of chips produced by passing artificially prepared calcium carbonate between rolls under varying conditions are given in Table XXV.

*Table XXV*

| Test No. | Calcium carbonate | Diam. of rolls, inches | Equal or differ. speed rolls | R. P. M. of equal speed rolls or of slow speed roll of differ. rolls | Pressure, lbs. per linear inch | Thickness chip, inches |
|---|---|---|---|---|---|---|
| 185 | Uncoated, dry | ⅝ | Diff | Slow, not measured | Small, not measured | .003 |
| 186 | ----do | ⅝ | Equal | ----do | ----do | .004 |
| 187 | Coated, dry | ⅝ | ----do | ----do | Approx. 250-350 | .003 |
| 188 | Coated, dry (different sample) | ⅝ | ----do | ----do | ----do | .006 |
| 46 | Uncoated, dry | 6 | ----do | 28.5 | 100 | .033 |
| 47 | ----do | 6 | ----do | 28.5 | 200 | .028 |
| 48 | ----do | 6 | ----do | 28.5 | 500 | .017 |
| 51 | ----do | 6 | ----do | 28.5 | 3,000 | .010 |
| 53 | ----do | 6 | ----do | 28.5 | 5,000 | .009 |
| 55 | ----do | 6 | ----do | 28.5 | 15,000 | .010 |
| 67 | Uncoated, 84.1% dry | 6 | ----do | 28.5 | 100 | .042 |
| 69 | ----do | 6 | ----do | 28.5 | 500 | .031 |
| 72 | ----do | 6 | ----do | 28.5 | 3,000 | .020 |
| 75 | ----do | 6 | ----do | 28.5 | 10,000 | .013 |
| 76 | ----do | 6 | ----do | 28.5 | 15,000 | .012 |
| 57 | Coated dry | 6 | ----do | 28.5 | 100 | .012 |
| 59 | ----do | 6 | ----do | 28.5 | 500 | .009 |
| 62 | ----do | 6 | ----do | 28.5 | 3,000 | .006 |
| 64 | ----do | 6 | ----do | 28.5 | 5,000 | .005 |
| 66 | ----do | 6 | ----do | 28.5 | 15,000 | .007 |
| 77 | Coated, 85.4% dry | 6 | ----do | 28.5 | 100 | .012 |
| 78 | ----do | 6 | ----do | 28.5 | 200 | .016 |
| 80 | ----do | 6 | ----do | 28.5 | 1,000 | .011 |
| 84 | ----do | 6 | ----do | 28.5 | 5,000 | .008 |
| 86 | ----do | 6 | ----do | 28.5 | 15,000 | .008 |
| 131 | Uncoated, dry | 6 | Diff | 8.8 | 50 | .029 |
| 132 | ----do | 6 | ----do | 8.8 | 100 | .019 |
| 135 | ----do | 6 | ----do | 8.8 | 1,000 | .014 |
| 137 | ----do | 6 | ----do | 8.8 | 5,000 | .009 |
| 139 | ----do | 6 | ----do | 8.8 | 15,000 | .012 |
| 149 | Uncoated, 84.1% dry | 6 | ----do | 8.8 | 50 | .062 |
| 150 | ----do | 6 | ----do | 8.8 | 100 | .036 |
| 151 | ----do | 6 | ----do | 8.8 | 200 | .030 |
| 153 | ----do | 6 | ----do | 8.8 | 1,000 | .022 |
| 156 | ----do | 6 | ----do | 8.8 | 10,000 | .019 |

*Table XXV*—Continued

| Test No. | Calcium carbonate | Diam. of rolls, inches | Equal or differ. speed rolls | R. P. M. of equal speed rolls or of slow speed roll of differ. rolls | Pressure, lbs. per linear inch | Thickness chip, inches |
|---|---|---|---|---|---|---|
| 140 | Coated, dry | 6 | do | 8.8 | 50 | .012 |
| 141 | do | 6 | do | 8.8 | 100 | .012 |
| 144 | do | 6 | do | 8.8 | 1,000 | .008 |
| 146 | do | 6 | do | 8.8 | 5,000 | .006 |
| 148 | do | 6 | do | 8.8 | 15,000 | .007 |
| 157 | Coated, 85.4% dry | 6 | do | 8.8 | 50 | .017 |
| 158 | do | 6 | do | 8.8 | 100 | .015 |
| 161 | do | 6 | do | 8.8 | 1,000 | .013 |
| 163 | do | 6 | do | 8.8 | 5,000 | .009 |
| 164 | do | 6 | do | 8.8 | 10,000 | .008 |
| 98 | Uncoated, dry | 20 | Equal | 8.3 | 100 | .063 |
| 99 | do | 20 | do | 8.3 | 200 | .052 |
| 100 | do | 20 | do | 8.3 | 500 | .039 |
| 101 | do | 20 | do | 8.3 | 1,000 | .031 |
| 103 | do | 20 | do | 8.3 | 5,000 | .021 |
| 104 | do | 20 | do | 8.3 | 10,000 | .022 |
| 107 | Uncoated, 85.6% | 20 | do | 8.3 | 200 | .107 |
| 109 | do | 20 | do | 8.3 | 1,000 | .092 |
| 110 | do | 20 | do | 8.3 | 2,000 | .066 |
| 113 | do | 20 | do | 8.3 | 5,000 | .060 |
| 115 | do | 20 | do | 8.3 | 15,000 | .048 |
| 117 | do | 20 | do | 8.3 | 25,000 | .037 |
| 119 | Coated, 85.2% dry | 20 | do | 8.3 | 100 | .055 |
| 120 | do | 20 | do | 8.3 | 200 | .038 |
| 121 | do | 20 | do | 8.3 | 500 | .028 |
| 122 | do | 20 | do | 8.3 | 1,000 | .026 |
| 126 | do | 20 | do | 8.3 | 5,000 | .021 |
| 128 | do | 20 | do | 8.3 | 15,000 | .022 |
| 130 | do | 20 | do | 8.3 | 25,000 | .022 |

As noted from the above table, chips may be produced in a wide variety of thicknesses. In many cases I have found that the chips obtained at lower roll speeds are thicker, becoming thinner as the roll speed gets higher up to a certain point, and then in many cases remaining very nearly the same thickness as the speed is increased. Whereas I have stated that the calcium carbonate comes through the rolls in the form of chips, by which I mean comparatively flat sections of the compressed calcium carbonate, it does not always come through in exactly this form, in many instances being much more broken up and in some cases, particularly if the doctors are positioned sufficiently close to the exit of the nip, the calcium carbonate is apt to be delivered in a rather coarsely comminuted or granular condition.

I have stated above that artificially prepared calcium carbonate may be made in a variety of ways, and have given illustrations of methods of its preparation. Calcium carbonate prepared by artificial methods responds to my process, those methods given being illustrative examples of artificially preparing calcium carbonate. I have found that artificially prepared calcium carbonates of all degrees of fineness respond to my process, from coarse particle size through varying degrees of fineness up to such fineness that they may be said to approach or be in the colloidal condition. Naturally, however, the absolute magnitude of the effect obtained is not the same or even similar with every sample, but varies according to the method of manufacture of the calcium carbonate, conditions under which it is produced, conditions of rolling and the other variables involved. Artificially prepared pigments comprising calcium carbonate, such for example as calcium carbonate magnesium hydroxide and calcium carbonate magnesium basic carbonate, also respond to my process. On the other hand, naturally occurring carbonates, such as naturally occurring limestone, naturally occurring marble, and naturally occurring chalk, all for example in comminuted form such as they occur commercially, do not respond to my process. These latter materials appear to be affected by my process, as indicated by the oil absorption test, either not at all, or if at all, in no substantial degree. For purposes of illustration, tests are listed in Table XXVI as examples of some of the facts given above. All tests except Test No. 191 were run on 6" diameter equal speed rolls, Test No. 191 being run on 20" diameter equal speed rolls.

*Table XXVI*

| Test No. | Composition of material | Method of manufacture, or naturally occurring source | Condition as to fineness or coarseness | Oil absorption | | Lbs. per linear inch pressure |
|---|---|---|---|---|---|---|
| | | | | Original | Sample after passing between rolls | |
| 53 | Calcium carbonate, dry | Manufactured from lime and carbon dioxide. | Relatively coarse | 53.0 | 19.8 | 5,000 |
| 190 | Same | Same | Fine | 43.6 | 25.2 | 6,000 |
| 191 | Calcium carbonate, coated, 89.5% dry. | Manufactured from lime and sodium carbonate. | Relatively coarse | 50.0 | 18.9 | 5,670 |
| 192 | Calcium carbonate, 86.6% dry | Same | Fine | 32.1 | 20.5 | 6,800 |
| 193 | Calcium carbonate 84.9% dry | Manufactured from calcium chloride and sodium carbonate. | Relatively very coarse | 22.8 | 15.9 | 6,200 |
| 194 | Calcium carbonate magnesium hydroxide 67.8%. | Manufactured from lime containing magnesia and sodium carbonate. | Fine | 35.0 | 26.3 | 500 |
| 195 | Calcium carbonate magnesium basic carbonate, dry. | Manufactured from lime containing magnesia and carbon dioxide. | do | 55.6 | 25.0 | 5,000 |
| 196 | Calcium carbonate, dry | Naturally occurring limestone, ground. | Relatively very coarse | 11.2 | 11.5 | 5,700 |
| 197 | Calcium carbonate, 85.1% dry | Same | Same | 11.2 | 11.2 | 5,500 |
| 198 | Calcium carbonate, dry | Same, a different sample | do | 13.0 | 12.6 | 5,250 |
| 199 | Same | Naturally occurring chalk, ground | do | 15.3 | 15.2 | 5,700 |

I have disclosed herein the passage between rolls, at various pressures, of artificially prepared calcium carbonate, both dry and with various percentages of moisture, citing as examples of the moist calcium carbonate samples which were 88.8%, 85.4% and 79.6% dry. In Table XII, I have further disclosed the use of calcium carbonate as moist as 64.7% and 59.7% dry, stating that the general effect of passing such moist calcium carbonate between rolls is along the same lines as that obtained with calcium carbonate of lesser moisture content, but that the magnitude of the effect may vary somewhat therefrom. As stated and exemplified previously herein, the use of moist calcium carbonate in place of dry greatly increases the yield, which of course is accomplished by the substantially increased rate of feed taken by the rolls. I have found, however, that a calcium carbonate of successively higher moisture content is used, a point is reached at which the yield is no longer increased or even maintained at its former level, but rather at which the feeding of the rolls becomes more difficult, the nip of the rolls not grasping the calcium carbonate so well as at somewhat higher dry contents. The feeding difficulty manifests itself both with larger diameter rolls such as 20" diameter rolls as well as with smaller diameter rolls such as 6" diameter rolls, and although the actual moisture content at which the feeding difficulty begins to manifest itself may vary somewhat with the roll diameters, the same general effect is shown at any diameter so far tried.

I have found that this failure of the rolls to feed satisfactorily is related to the pressure employed per linear inch, and as the moisture content of the calcium carbonate fed increases, a pressure per linear inch is reached, varying of course with roll diameter, above which, at the moisture content in question, the rate of feed becomes very poor or even practically ceases, the moist calcium carbonate merely remaining in the nip with the rolls slipping by it without gripping it, or at most merely coating the rolls with a very thin film of calcium carbonate. However if, at such moisture content, the pressure per linear inch be reduced, there is a zone of pressure in which the moist calcium carbonate begins to feed somewhat better and finally a pressure is reached at which it feeds at a satisfactory rate. For example, using 20" diameter equal speed rolls, an artificially prepared calcium carbonate at 65.6% dry content fed at a very poor rate at a pressure per linear inch of 10,000 lbs., but a satisfactory rate of feed was attained by reducing the pressure per linear inch to 3,500 lbs.

As the moisture content of the samples tested is gradually increased, the upper pressure per linear inch at which the calcium carbonate will feed at a satisfactory rate becomes less, and finally, when the sample contains sufficient moisture, a point is reached where it will not feed at a satisfactory rate even at a very low pressure per linear inch. This may be illustrated by a series of tests which were run on 6" diameter equal speed rolls, using an artificially prepared calcium carbonate, in which, on a sample 64.7% dry, a satisfactory rate of feed was obtained at 1500 lbs. pressure per linear inch, but on a sample 59.7% dry the rate of feed was considerably less even at a pressure no higher than 200 lbs. per linear inch, and became worse at higher pressures, while on a sample 55.6% dry, the rate of feed was very poor at even as low a pressure as 25 lbs. per linear inch.

Moreover, with the relatively moister samples of calcium carbonate, it is somewhat difficult to prepare the calcium carbonate in a form which feeds readily, that is, in either particulate form or in small aggregates or lumps, because the particles have a tendency to adhere. However, the rate of feed can be somewhat increased in the moister samples, if the sample be sufficiently stiff when it is in mass form, by subdividing the sample into relatively large lumps, say ⅛ to a ¼" cubes or even larger. With the relatively moister calcium carbonate in this form, it appears to feed at a somewhat better rate, and the rolls will thus more satisfactorily feed calcium carbonate of a little higher moisture content than otherwise. However even this expedient fails when the moisture content is increased further.

It is highly desirable under certain conditions of operation to pass the calcium carbonate between rolls in as moist a form as possible, for the reason that most artificial calcium carbonates are prepared in a water suspension, and after preparation are either settled by sedimentation or are filtered to a sludge or paste of as high a dry content as feasible. Where the calcium carbonate is of relatively coarse particle size, the settled or filtered sludge may have a dry content of 50–55% or even more, but in the case of sludges of finer particle size, it is frequently difficult to obtain them of dry contents of more than about 35, 40 or 45%. In certain cases where the calcium carbonate is of sufficiently fine particle size to approach or be in the colloidal condition, the sludge obtained may not be more than 20 to 30% dry. In many cases, as for example in the paper industry, artificially prepared calcium carbonate is used in the sludge condition at the plant at which it is manufactured, or is shipped in this condition, and thus it would be highly desirable to be able to pass the calcium carbonate between the rolls in sludge condition at the dry content at which it is obtained in the manufacturing operation, if some method could be found of accomplishing this result, without the necessity of subjecting the sludge to a preliminary dewatering or drying operation in which sufficient of the moisture would be removed so that the calcium carbonate could be prepared in particulate or crumb form which would feed readily into the nip of the rolls. Even where the calcium carbonate is to be used in dry form, the passage between rolls at a high moisture content would in certain cases be convenient as it would sometimes obviate the necessity of a pulverizing step preliminary to passage of the calcium carbonate between the rolls, which might otherwise be required when dry calcium carbonate is used.

It will thus be seen that any expedient by which it were possible to pass calcium carbonate between rolls under pressure in sludge form at or about the dry content at which it is produced, would be of great practical utility. I have devised several methods by which it is possible to feed, between rolls under pressure, calcium carbonate of a higher moisture content than will otherwise feed, at least at any satisfactory rate, or by means of which it is possible to pass calcium carbonate of a given moisture content between rolls at a higher pressure than would otherwise be feasible under ordinary conditions. One procedure which is helpful is to provide one or both of the rolls with a rough surface. The surface of one or both of the rolls may be roughened slightly, or may be provided with spiral ridges, or ridges parallel to the axis, or with various depressions, indentations or designs which tend to grip the feed better. Or an irregular or pitted surface such as is provided by a wire cloth attached to the surface of the roll or rolls may be employed. However, of the various expedients for providing a rough or gripping surface to the roll, the best I have found so far appears to be to apply a textile fabric. While any kind of cloth may be employed, I have found cotton cloth to be suitable. If one or both of the rolls is provided with a cloth covering or sleeve, for example one of fairly thick and strong cloth, the calcium carbonate will be taken in satisfactorily at the nip of the rolls at a higher moisture content than would be the case if the rolls were without covering, or at a higher pressure than would otherwise be feasible at a given moisture content. If a pool, or excess water, accumulates in the nip, it may be drained off in a suitable manner preferably continuously.

A modification of this principle which also works satisfactorily is the use of an endless cloth belt, or preferably two belts, of considerably greater length than the circumference of the individual roll, one surrounding each roll and passing through the nip of the rolls, but extending beyond the rolls and preferably kept substantially taut by means of one or more stretch rolls operating within each belt beyond the pressure rolls, the pressure rolls in effect forming pulleys over which the individual belts pass, the outside surfaces of the belts contacting under pressure at the point of the nip of the rolls. This arrangement provides a method whereby any stretch which may occur in the belts may be compensated for and the belts may pass continuously and smoothly between the pressure rolls. It is possible to employ wire cloth belts preferably of the wire filter cloth type in place of cloth fabric belts.

However in certain cases I have found that even cloth coverings, sleeves or belts on the rolls will not effect an adequate rate of feed for those calcium carbonates containing the higher moisture contents which it may be desirable to process, and for this purpose I have devised another expedient. This is to provide, additionally to coverings or belts, in substitution for one or both of the usual pressure rolls, a pressure roll or rolls with perforations, preferably small, or narrow slots, in the surface of the roll, through which any water which may be squeezed out at the nip may be forced into the interior of the roll, from which it may be removed preferably continuously. I have also devised a further modification of this expedient which is effective. This is to induce a vacuum or partial vacuum in one or both of the pressure rolls, applicable through the perforations or slots in the roll surface, over which perforations or slots, as before, fits a sleeve of close mesh wire cloth such as a wire filter cloth, or conveniently a fabric cloth covering such as cotton cloth, which is, of course, water permeable. The application of vacuum may take place through the entire peripheral surface of the roll or rolls, but it is more convenient to have the application of vacuum apply to that section of the roll above or near the nip to a point preferably just below the nip. This may be accomplished by applying vacuum through the entire peripheral surface of the roll but shutting it off from that part of the roll on which it is not wanted, by application of a close fitting stationary cover or shield on that portion of the outside surface of the moving roll where the vacuum is not desired. A preferable arrangement, however, is to provide rolls equipped with a device similar to that employed on the suction rolls of a paper machine, in which the suction or vacuum is applied through a given arc of perforated roll by an interior suction port, the suction port remaining stationary while the outside perforated shell of the roll revolves. The preferable zone of application of the suction or vacuum here, as above, is in a zone including the nip of the rolls.

I may, if desired, as in the case of the use of perforated or slotted rolls without the use of vacuum, employ instead of sleeves on the rolls the optional expedient of a traveling wire cloth, belt or belts, or preferably textile fabric cloth belts, passing continuously between the rolls and conveniently over stretch rolls spaced apart from the main rolls. In any case, the vacuum or suction is preferably applied to the main roll or rolls through one or both journals in a manner similar to that employed on suction rolls on paper machines. The roll or rolls provided for use with a vacuum must be constructed sufficiently strong to bear the pressure exerted upon them. The belts, of course, are water permeable.

By the above expedients there can be successfully passed between rolls, under suitable pressure, calcium carbonate of practically any moisture content, e. g., from a stiff sludge down to a soft pasty consistency, including sludges or pastes which are obtained by settling or filtering artificially prepared calcium carbonate in the regular course of manufacture, in certain cases even down to a slurry of calcium carbonate in water, in the latter case the excess water being extracted by the vacuum exerted in the roll or rolls, through the belt or cloth surface, and the calcium carbonate being subjected to the desired pressure during its passage between the rolls. Where a slurry of calcium carbonate in water is used, which however is not my preferred practice, it is generally desirable to apply the vacuum to a longer arc of the roll than when a pasty sludge is used, to provide in effect a preliminary filtration of the slurry on the cloth or belt surface on the roll, so that the calcium carbonate may be in paste or sludge form when it approaches the nip of the rolls, otherwise the nip will not take it.

I have found that when operating on sludges or slurries of calcium carbonate or material containing calcium carbonate, using cotton cloth belts for example, I greatly reduce the moisture content of such sludges or slurries, for instance in one case a sludge having a moisture content of 44.8% was reduced to a moisture content of 29.7%. These are merely illustrative figures and sludges passed between rolls may have either higher or lower moisture content depending upon the moisture content of the calcium carbonate used, the pressure to which it is subjected by passage between the rolls, whether or not a vacuum or suction has been employed, and if so of what intensity.

I have stated above that dry or moderately moist (e. g., down to about 80% dry) calcium carbonate when passed between rolls under pressure comes through in the form of chips, usually accompanied by more or less powder. When moister calcium carbonate is used, this situation changes. For example, in one sample 75% dry it was found that in addition to the chips, which were the major part of the product passing between the rolls, there was apt to be present a slight amount of sludgy material. The proportion of this sludge in the product increases as the percentage of moisture in the sample increases, until when the calcium carbonate is fed, for example in one case at 67.4% dry, the product is practically all in sludge form if the pressure per linear inch be high enough, or in the form of rather moist chips at lower pressures. Also as the moisture content of the feed increases, there is a concomitant reduction and finally a disappearance of powder in the product. Even the sludge form of the product may be accompanied in certain cases, especially if the feed is not uniform, with minute hard chips which apparently may result from certain individual lumps of the feed being grasped by the rolls and subjected probably to a higher local pressure, but this, if it occurs at all, represents only a very small part of the product. However, as moister and moister samples of calcium carbonate are fed so that it is in the form of a more or less stiff or heavy paste or sludge, it does not come through the rolls in the form of chips at all, regardless of the pressure per linear inch applied, but rather as a thin moist layer or sludge on one or both of the rolls, which may be doctored or scraped off. If sleeves or belts are used on the higher moisture content samples, the thin layer is usually delivered in a drier form, and may be doctored off, broken off, or brushed or blown off therefrom, by any suitable means.

It will be understood that the reduction of the water content in the moister samples, which accompanies the change in properties in the calcium carbonate brought about by passing through the rolls under pressure, is very advantageous in many cases. For example, where shipment is to be made of calcium carbonate in sludge or paste form, the reduction in moisture content substantially without extra cost effects a considerable saving in freight, as well as a saving in container cost by reducing the number of containers required because of the lesser bulk to be shipped, and where the calcium carbonate is to be used in sludge form in the plant at which it is made, the reduction in moisture content is often an advantage because of the fact that it is sometimes desirable to use the material in wet form but at a higher dry content than that at which it is produced in the manufacturing operation. Where the calcium carbonate is to be subsequently dried at the same plant, there is also a distinct economy because of saving in drying costs.

When using the expedients I have described for passing moister calcium carbonate between rolls, I may use equal speed rolls, or I may use differential speed rolls, but in the latter case failure of feed should preferably be avoided, as when running idle the sleeves, or belts, may tend to rub on one another with consequent possible damage.

There is another very important advantage in pressing calcium carbonate in very moist form which I shall describe in more detail later when taking up the use of calcium carbonate, subjected to my process, as a pigment in coating paper.

Hitherto herein I have employed the oil absorption test as a measure of the effect of my process on artificially prepared calcium carbonate, and have shown how the oil absorption of such calcium carbonate is very markedly reduced by subjecting it to my process. This is a result of great technical and economic importance; but as stated previously, my process also produces changes in other properties of the calcium carbonate subjected to it which also are of industrial importance, for example, the reduction in the adhesive requirement of the processed calcium carbonate when used in water paints, and particularly when used as a pigment in coating paper.

As is well known in the manufacture of coated paper, the pigment, for example artificially prepared calcium carbonate, either dry or preferably in wet condition, is usually mixed with an adhesive, generally in solution or colloidal dispersion in water. In the majority of cases the adhesive employed is an aqueous alkaline solution of casein. Additional ingredient or ingredients may be included in the mixture as desired, e. g., other pigments, other adhesives, "eveners," softeners, plasticizers, waterproofing agents, anti-foam agents, and coloring material. The resulting mixture, in some cases after dilution, is then applied to one or both surfaces of a paper web by any of the means known in the art, by any suitable device on the paper machine itself, either before, during or after the drying of the paper web, or on a separate coating machine. The paper web after it has been coated may be finished if desired. In certain cases it may be finished before drying, but usually the finishing operation is conducted after the coated paper web has been dried, suitably by passing it between rolls of a calender.

By utilizing artificially prepared calcium carbonate processed according to my invention, e. g., that which has been passed between rolls under pressure in dry form, I have obtained coated paper which has a strong coating, although there was used substantially less, e. g., from about 10 to 60% less, adhesive than was required to obtain a strong coating on paper when using the same calcium carbonate prior to treatment by my process, and in some cases even a greater percentage saving in adhesive was indicated. In general, on rolls of any given diameter the higher the pressure per linear inch at which the calcium carbonate is passed between the rolls, within reasonable limits, the greater is the percentage saving in adhesive required. I have found that the processed dry calcium carbonate, which after passing between rolls is, for convenience in mixing, normally ground, as in a Raymond mill or the like and usually subject to air separation, in certain cases is apt to give a paper coating which is somewhat rough as indicated both by touch and by observation of the coated paper through a low power magnifying glass. I have, however, been able to overcome this difficulty by grinding the processed dry calcium carbonate either in the form of chips (or after it has passed through a Raymond mill or the like) in a mill which provides intensive grinding, such for example as a ball, pebble or rod type mill. This grinding takes an appreciable length of time, depending of course on the size of the mill, but the grinding time may generally be shortened and the results obtained usually bettered as to smoothness of coated paper, if the grinding is done in the presence of water, preferably sufficient to give a thick slurry.

In studying the matter of rough coating on paper, which as stated is sometimes encountered when the calcium carbonate used is passed between rolls in a dry form, I have experimented with passing calcium carbonate between rolls in moist form. I have found that when the calcium carbonate contains a moderate amount of moisture, for example down to 80% dry or thereabouts, better results in respect to the smoothness of the coating on paper are obtained than when using calcium carbonate which has been processed in dry form. The moist calcium carbonate after processing may be dried, preferably ground as in a Raymond mill, and used in that condition. However, better results are generally obtained by using the moist calcium carbonate in coating mixes, after comminution if desired, without allowing it to dry out. The resulting coated paper, although usually better in respect to smoothness than obtained with the dry processed calcium carbonate, is nevertheless not as smooth as is desired in all cases, but I have found that by subjecting this processed moist calcium carbonate to treatment in a ball mill, or other intensive grinding mill effective for the purpose, either after a preliminary drying, but more suitably while it is still in moist form and preferably after adding further water to convert it into a thick slurry, I obtain a very satisfactory smooth coated paper therefrom.

The fact that processing the calcium carbonate even in moderately moist condition did not give results in some cases as satisfactory as might be desired, was an important factor in directing my investigation to the possibility of passing very much moister calcium carbonate between rolls under pressure, in an endeavor to obtain a processed calcium carbonate which would produce a perfectly smooth coating in all cases without the necessity of possible subsequent treatment, such as in a ball mill, to obtain that result. I have found that if artificially prepared calcium carbonate is run between rolls at a substantially higher moisture content than the 80% dry figure mentioned above, the so processed calcium carbonate usually gives a smooth coated paper. However, if the pressure per linear inch is increased beyond a certain point, depending on the diameter of the rolls used, there is a tendency in certain cases toward a rougher coated paper, and if desired in such cases, the subsequent ball mill or the like treatment may be resorted to, either after a preliminary drying or preferably in a wet slurry form as indicated previously.

I have further found, however, that by utilizing calcium carbonate of such moistness that it exists in the form of a pasty sludge or even moister, e. g., in such form as it is produced in by sedimentation or filtering in the course of its manufacture, I have been able to pass such calcium carbonate between rolls at still higher pressures per linear inch and yet obtain smooth paper coatings therefrom either directly, or after prior drying of the processed calcium carbonate if desired, without requiring any subsequent treatment such as by ball mill or the like, although of course such treatment may be resorted to additionally, if desired, for any purpose, preferably while the calcium carbonate is wet, or if desired, after it has been dried.

Broadly speaking, the reduction in adhesive requirement of the calcium carbonate produced by passing between rolls corresponds very roughly to the reduction in oil absorption of the same calcium carbonate. I have found, however, that in certain cases where the reduction in oil absorption of the calcium carbonate is rather less than would be desired for the best results in paints, that a relatively better result is shown in the reduction of the adhesive requirement of such calcium carbonate when used in coating paper. In other words, certain of the lower pressures per linear inch employed give fairly satisfactory results in the processing of artificially prepared calcium carbonate for use in coating paper, and so it is not necessary in some cases to employ as high a pressure per linear inch as may be employed, for example, where the oil absorption of the pigment is desired to be very greatly reduced.

For example I have found that there is a detectable difference in certain cases in the adhesive requirement of artificial calcium carbonate as originally prepared and after it has passed between 6″ diameter equal speed rolls even at as low a pressure as 25 lbs. to the linear inch, but this is a lower pressure than that at which I usually prefer to operate on such 6″ diameter equal speed rolls. By passage between such rolls at 100 lbs. per linear inch a substantial decrease in adhesive requirement is obtained, at 300 and 500 lbs. even better results, and at 750 to 1500 lbs. excellent results are obtained. By the employment of the special techniques described above for passing calcium carbonate in sludge form between rolls, I have been able to use such pressures as mentioned, or even much higher pressures. The so processed calcium carbonates display a reduction in adhesive requirement of some 10 to 60% or even more in some cases, compared with the adhesive requirement of the original artificially prepared calcium carbonate.

Solely for purposes of illustration, Table XXVII lists a series of tests showing the reduction in adhesive requirement obtained by passing a sample of artificially prepared calcium carbonate between 6″ diameter equal speed rolls at various pressure per linear inch.

*Table XXVII*

| Test No. | Pressure, lbs. per linear inch | Percent casein required for strong paper coating, based on wt. of calcium carbonate used | Reduction in casein requirement, based on the casein requirement of the original calcium carbonate as unity |
|---|---|---|---|
| | | | *Percent* |
| 45 | 0 | 25 | |
| 87 | 100 | 17 | 32 |
| 88 | 200 | 17 | 32 |
| 89 | 500 | 15 | 40 |
| 90 | 750 | 13 | 48 |
| 91 | 1,000 | 10 | 60 |
| 92 | 1,500 | 10 | 60 |

The calcium carbonate used in the above series of paper coating tests was the 64.7% dry sample, data on which is shown in Table XII. Identical results as to reduction in adhesive requirement in the range from 100 to 750 lbs. were obtained on the other series run in that range shown in Table XII, namely, that run on the 59.7% dry sample.

Another illustrative series of paper coating tests, run on the pigment calcium carbonate magnesium hydroxide, is shown in Table XXVIII.

*Table XXVIII*

| Test No. | Pressure, lbs. per linear inch | Percent dry, at which pigment was passed between rolls | Percent casein required for strong coating, based on weight pigment used | Reduction in casein requirement, based on the casein requirement of the original pigment as unity |
|---|---|---|---|---|
| | | | | *Percent* |
| 200 | | | 22 | |
| 201 | 100 | 58.5 | 20 | 9 |
| 202 | 100 | 67.8 | 17 | 23 |
| 203 | 200 | 58.5 | 19 | 14 |
| 204 | 300 | 67.8 | 15 | 32 |
| 205 | 500 | 67.8 | 14 | 36 |

The paper coating tests to determine adhesive requirement recorded herein were made according to the test customarily used in the art for the purpose, namely, the compounding in the laboratory of a coating mix or so-called coating "color" comprising the calcium carbonate and the amount of adhesive to be employed, spreading this coating mix on sheets of paper, drying the same, and then submitting the coated sheets to the wax test employing the "Dennison" series of numbered waxes. Various coating mills and laboratories use different ones of this series of waxes as the standard with which a given coated paper must comply in order to be considered to have a strong coating, and there is thus no definite standard in the industry in this respect. Moreover various types of coated paper intended for different uses require coatings of strengths complying to different waxes. In the present tests, therefore, it was necessary to make a choice of a standard. After some consideration, No. 4 wax was chosen as it is the one which is used in a number of instances as standard for several widely used types of coated paper. Thus where a strong coating is referred to herein, it is meant that the coating in question shows no pick on Dennison No. 4 wax. A good description of the wax test as applied to coated paper is given by W. A. Kirkpatrick in the "Paper Trade Journal," vol. 109 (1939), No. 12, page 36.

The illustrative series of tests in Tables XXVII and XXVIII were performed with casein (derived from milk), the adhesive most commonly used in the manufacture of coated paper. However similar reduction in adhesive requirement of artificially prepared calcium carbonate processed by my method is noted with the other adhesives employed in the paper coating indsutry, such as starch, either unmodified, or more usually in some modified form, glue, gums, or protein or proteinaceous or protein containing adhesive derived from other sources such as soya bean, corn (zein), and the like, casein (derived from milk) in modified, combined or soluble form, as well as other materials useful as adhesives in coating paper.

I have stated previously herein that, while I usually employ hard surface rolls, softer or more yielding rolls, or rolls one or both of which are faced with softer or more yielding material, are better adapted for some purposes. I have also pointed out that artificially prepared calcium carbonate processed by passing between rolls when in a dry or somewhat moist condition is in some cases apt to give a rough coating on coated paper. In many instances I believe this may be due to the fact that certain groups of the particles at isolated points, where the feed may have been locally greater and thus may have been subjected to a greater local pressure, have been so firmly pressed together between the hard metal surfaces of the rolls that these groups form lumps which do not break up easily when the calcium carbonate is subsequently mixed with water, and thus tend to give a more or less rough coating on paper. I have also pointed out the advantages of cloth covered rolls, or rolls arranged with a cloth belt or belts, for improving the yield when employing calcium carbonate of high moisture content as feed, and the fact that such calcium carbonate processed with such equipment gives a smooth coating even at relatively higher pressures per linear inch.

I have found that the tendency of the calcium carbonate to give a rough coating on paper can be overcome not only when the calcium carbonate is processed at high moisture content as indicated just above, but also in many cases when the calcium carbonate is processed in dry or moderately moist form, providing rolls with surface characteristics relatively softer and more yielding than steel, or rolls equipped with cloth sleeves or belts, be employed. I may employ, for example, steel rolls covered with a cloth covering, or sleeves, or steel rolls with a belt or belts travelling thereon as previously described, or I may employ rolls of material substantially softer than steel, or with a relatively more yielding surface, but one which is not too soft or too yielding because of course in that case the calcium carbonate may tend merely to be embedded at the nip of the surface, and the pressure may be dissipated by the distortion of the roll material at our near surface at the nip and not be properly applied to the calcium carbonate. Moreover the nip of rolls with too soft or too yielding a surface may be so flattened by distortion of the true cylindrical surface of the rolls by pressure, as to enlarge the nip surface to which the pressure is applied and thus reduce the effect of the pressure actually applied. The preferable type of surface to use is one, which, like a textile material, will yield under pressure up to a certain point and then oppose strong resistance to further yielding. In certain instances, particularly to avoid contamination of the processed calcium carbonate with fibres which may come off or be pulled off fabric sleeves or belts, I may employ impregnated sleeves or belts, for example, those impregnated with rubber or rubber like material or other suitable material, and which thus present a surface which does not shed fibre, or I may coat the sleeves or belts with a layer, preferably a relatively rather thin layer, of rubber or other suitable material against which doctor blades can operate smoothly without danger of removing fibre, and which will not contaminate the calcium carbonate with fibre, and yet which is not too soft or yielding, because this would entail the difficulties indicated above.

As will be apparent, other relatively yielding but not too soft rolls may be used, for example, rolls made of fabric in which fabric discs are placed on a core and then compacted into a roll by endwise pressure, the roll being finally turned to true cylindrical form, rolls fabricated for example similarly to so-called "cotton" calender rolls, or any other roll or roll covering which provides a surface with a somewhat yielding or resilient characteristic, but is not too soft and too easily distortable under the pressure to be employed. Even a rather thin rubber or similar facing on a metal roll may be used providing the pressure applied is not to be too high and the rubber in the facing is not too soft or too thick. If hard rubber is used, the facing may be somewhat thicker.

By such means I have been enabled to obtain processed calcium carbonate which will produce smooth coated paper, even when the calcium carbonate is processed either dry or only somewhat moist. I have also found such equipment useful for the processing of calcium carbonate in which the oil absorption is sought to be reduced, providing that the reduction in oil absorption is obtainable with the amount of pressure per linear inch which rolls, or sleeve or belt equipped rolls, of this character are capable of withstanding. It is obvious that equipment of such character cannot be operated at as high a pressure per linear inch as can hard surface rolls, and furthermore as explained above the pressure per linear inch on the rolls of such equipment is actually less effective than the same pressure per linear inch on hard surface rolls of the same diameter, because of the larger area actually under pressure due to the distortion or flattening of the rolls, sleeves or belts at the nip, and thus to obtain the same effect as on hard surfaced rolls a proportionately higher pressure per linear inch must be employed.

I have described herein in detail the processing of artificially prepared calcium carbonate whereby its oil absorption is substantially reduced, which renders the calcium carbonate particularly desirable for use in paints, enamels, lacquers and the like; as well as the processing of artificially prepared calcium carbonate with particular attention to the reduction of its adhesive requirement, which renders the calcium carbonate especially desirable for use in manufacture of coated paper, cold water paints and like. While I have pointed out the effect of various conditions of operation on the results obtained, I now indicate the particular adaptations of operation preferred by me, without however thereby restricting myself in any way to these particular preferred adaptations or practices.

For use in the paint and enamel industry or the like, the calcium carbonate is artificially prepared by any desired process, for example such as those previously described herein, then preferably coated as with rosin, for example by the method hereinafter described. If it is to be used in rubber, I prefer to coat it with stearic or lauric acid. The calcium carbonate, which is now usually in sludge or wet cake form, is dried by any suitable means to approximately 80-85% dry. This moist calcium carbonate, if it is not already in a somewhat powdery or granular form, is preferably comminuted to that form by any suitable means, and is then passed between rolls under pressure, the rolls being preferably of hard surface, and preferably internally water cooled, and the pressure per linear inch on the rolls being adjusted to give the desired reduction in oil absorption. The data given in the tables herein will serve as a general guide for deciding upon the pressure to employ, although of course the actual pressure to be employed will be adjusted according to results obtained. On such moist coated calcium carbonate as indicated above, for example when using 20" diameter equal speed rolls, I have found that excellent results are obtained with hard surfaced rolls by operating at pressures of between 5,000 and 10,000 lbs. per linear inch; and for example when using 6" diameter equal speed rolls, by operating at pressures between 2000 and 4000 lbs. per linear inch; and for example when using 6" diameter differential speed rolls by operating at pressures between 200 and 3000 lbs. per linear inch. In order to improve the yield, I prefer to apply water to the surface of the rolls. I have found that speeds of around 8 to 10 R. P. M. on 20" diameter equal speed rolls, around 20 to 30 R. P. M. on 6" equal speed rolls, and about 8 and 12 R. P. M. respectively on the slow and fast rolls of 6" diameter differential speed rolls, give satisfactory yields with rolls of the diameters in question while maintaining a low power requirement for the yields obtained, although as stated previously the yield on equal speed rolls is greater than on corresponding differential speed rolls. If there is any substantial amount of powder in the product delivered by the rolls, I find it convenient to pass the product over a separatory device such as a vibrating screen, which readily removes the powder, the powder passing through the screen, and this powder may be returned directly to the feed of the rolls. The yield in chip form delivered from the screen is then preferably passed to a final drying device to remove the remaining moisture, using preferably a device which will both dry and grind the calcium carbonate, such as a heated grinding mill, an example of one such mill being known as a "kiln mill." The dry powdered calcium carbonate is preferably subjected to air separation in conjunction with this drying and grinding operation whereby there is produced a finely divided product substantially free from lumps or grit, suitable for use in paint, enamel, rubber, or the like.

For use in coated paper, filled paper, cold water paints and the like, the calcium carbonate, as before, is artificially prepared by any desired process, but in contrast with that to be used in paints, it is usually not coated, except at times if it is to be used in certain types of filled papers. The calcium carbonate in sludge or wet cake form is preferably passed in that form between rolls under pressure, preferably vacuum or suction metal rolls over and between which pass belts permeable to water, and into the nip of which belts the sludge is fed, the vacuum being applied preferably to a fixed inner port in each roll traversed by the revolving roll, constituting an arc of say 45°–60°, located beginning somewhat above the nip of the rolls to just below it, including the nip itself. The vacuum on the rolls is preferably as high as may be conveniently obtained either by a wet vacuum system such as a Nash "Hytor" which may give 15-20" or thereabouts, or by a dry vacuum pump or other device such as a steam evacuator, which may give up to 28", in the case of a dry vacuum pump an intermediate separation device preferably being provided for the water extracted. On 6" diameter rolls, which in this case may be either of equal speeds, or of differential speeds if the possibility of injury to the belts be guarded against, a speed of about 25 R. P. M. is satisfactory for the equal speeds, and about half that for the higher speed of the differential speed rolls if used, and here, as before, the tables of data given herein may be used as a guide to judge the pressure per linear inch to employ. In using 6" diameter equal speed rolls, I prefer to use pressures varying from some 100 to 3000 lbs. per linear inch, and with the differential speed rolls perhaps a somewhat lower range, the higher pressures of course giving the greater reduction in adhesive requirement. The pressures to be used on rolls of other diameters will of course vary with any given diameter, as previously pointed out herein. The calcium carbonate after passing through the rolls, is doctored off the belts usually at a somewhat or even considerably higher dry content than that at which it was fed to the rolls, and may be used directly in this form for the manufacture of coated or filled paper or the like, or it may be dried if desired and preferably ground and air separated before use. If dry or somewhat moist calcium carbonate is to be processed instead of calcium carbonate in sludge form, in order to avoid the possibility of rough coating in coated paper, I prefer, as stated previously herein, to use rolls with somewhat yielding surface, or rolls provided with belts. As has been indicated previously herein, the processed calcium carbonate, either wet or dry, may if desired be submitted subsequently to treatment in a ball mill or the like.

As will be apparent to one skilled in the art, my process results in a remarkable reduction in the oil absorption of artificially prepared calcium carbonate and this reduction is of great technical as well as of great economic importance. This will be readily understood when it is appreciated that at least in most paints, which of course comprise fundamentally a pigment and a vehicle, a low oil absorption characteristic in the calcium carbonate used is highly desirable because the calcium carbonate is normally of very much less cost per unit of weight than is the vehicle, and when calcium carbonate has a low oil absorption, more of it in proportion to the vehicle can be used in a given mix, while still maintaining the low viscosity, good flowability and brushability desirable in a paint, enamel, lacquer or the like.

Thus, or other characteristics and properties being equal, calcium carbonate with a low oil absorption has a much higher economic value for such use than has calcium carbonate of a higher oil absorption. In fact, in certain cases it is not feasible to market to the paint, enamel, and lacquer trade certain artificially prepared calcium carbonates possessing otherwise satisfactory characteristics solely because they have a high oil absorption, and my process thus makes it feasible to extend the market for such calcium carbonates to fields from which they have hitherto been excluded.

In the manufacture of paints, enamels, or the like, in my preferred practice, I mix and preferably grind my processed preferably coated artificially prepared calcium carbonate, with the usual ingredients such as a vehicle, for example linseed, tung, oiticica oil or the like, or combinations thereof, together with suitable thinners if desired, such as turpentine, mineral spirits or the like, or combinations thereof, together with driers such as the cobalt, manganese and the like metal compounds normally used for this purpose, and I may also include natural or synthetic resin or resins, as well as other pigments if desired, employing the customary mixing procedures and apparatus normally used in the art for the purpose. Paints, enamels, and the like so made flow and brush well, give a durable film, of excellent strength, elasticity, and gloss, all of which are desirable characteristics in this class of product.

In the manufacture of such commodities as cold water paints, and particularly coated paper and the like, the outstanding characteristic of lower adhesive requirement of artificially prepared calcium carbonate processed according to my procedure will here again be recognized by one skilled in the art as of great importance technically as well as economically. From a technical standpoint, it will be apparent that it is now possible to manufacture coated papers containing a given artificially prepared calcium carbonate with a lesser percentage of adhesive than has hitherto been feasible with the same calcium carbonate, and a brighter, more ink receptive, higher finishing, more opaque and better printing coated paper is thereby obtained, as well as one which is more economical to produce. The economy effected is proportionately very large, particularly as the cost per pound of adhesive is usually greatly in excess of the cost per pound of the calcium carbonate. An example will serve to illustrate this point: at the present time (July, 1940) casein, which is the most widely used adhesive, sells on the American market for approximately 10¢ a pound or more. Artificial calcium carbonates prepared by various processes can be produced by paper mills from perhaps $6.00 per ton in certain very favorable cases up to perhaps $15.00 or more per ton, and artificially prepared calcium carbonate or pigments containing calcium carbonate sell on the market anywhere from $25 to $50 or more per ton. Assuming for the purposes of this computation that a manufacturer produces calcium carbonate at a cost of $10.00 per ton, and that this calcium carbonate requires 24% of casein, i. e., 480 lbs. per ton of calcium carbonate, to give a strong coating on coated paper, the cost for adhesive would thus be $48.00 per ton of calcium carbonate used.

By my process the casein requirement of such a calcium carbonate could be readily reduced to 16%, i. e., to 320 lbs. casein per ton of calcium carbonate, and sometimes perhaps as low as 10%, i. e., to 200 lbs. per ton. In the first instance there would be a saving of $16.00 and in the second a saving of $28.00 for casein per ton of calcium carbonate, or a saving from 1.6 to 2.8 times the entire cost of the calcium carbonate. From this saving would have to be deducted the cost of operating my process, but that is small, and does not alter the general magnitude of the savings made possible thereby. Thus it is seen that with the above initial casein requirement, if the calcium carbonate were relatively low priced, the saving in adhesive alone would more than pay for the entire cost of the calcium carbonate, and if the calcium carbonate were relatively higher priced, the saving in adhesive would still pay for a very substantial part of the cost of the calcium carbonate. If the calcium carbonate used initially required a lesser percentage of casein, the net savings by processing as described herein might be less, but in any case they would be very substantial.

In my preferred method for the manufacture of coated paper with my processed artificially prepared preferably uncoated calcium carbonate, e. g., that which has passed in paste or sludge condition on belts between pressure rolls operating under suction, and which may be 65-70% dry at this point, I preferably mix the calcium carbonate with water to reduce it to a pasty consistency usually about 50% dry. I may at this point if desired admix other pigments with it, such for example as clay, satin white, blanc fixe, titanium oxide, or combined titanium compounds, lithopone or other zinc compounds, talc, or the like, preferably also in aqueous paste form. The pasty calcium carbonate, either alone or in combination with other pigments, is then mixed with the appropriate quantity of adhesive, for example casein dissolved into aqueous solution form with sodium carbonate and ammonia, and thoroughly incorporated in a suitable mixer, and at this point there may be added if desired antifroth compounds, "eveners," softeners, plasticizers, waterproofing agents, finishing materials, wax emulsions or the like, or any other ingredients which may be used in coating paper, and the mix then applied to either one or both surfaces of a paper web either on the paper machine or on a separate machine as desired, and then subjected to any finishing process, before drying if desired, but usually after drying, for example to calendering. The coating applied may be of any weight desired from very light to very heavy as is customary in the art, including the light weight coatings used to make so-called "surface filled" papers, "filmed" or "film coated" paper, "machine coated" paper, and the like.

Coated paper produced as above described is of excellent quality, embodying the qualities resulting from the desirable characteristics of the calcium carbonate from which the processed calcium carbonate was made, such in certain cases as fine particle size, ability to take a high finish, good spreading qualities, opacity, high brightness, and excellent ink receptivity, and combining therewith the hitherto non-existent feature, namely, a low adhesive content, which gives a more opaque, better finished paper of improved printing qualities. Thus the coated paper possesses unique characteristics different from those of any paper hitherto made with the same calcium carbonate prior to processing.

Artificially prepared calcium carbonate, processed as described herein may also be used advantageously as a filler in the manufacture of filled paper. In my preferred manufacture of such paper, the calcium carbonate which has been processed as described herein either in dry, somewhat moist or pasty condition, is preferably mixed with water to a slurry form and added at whatever point desired in the papermaking system, e. g., to the fibrous mix either in the beater or other mixing or treating machine, or under minimizing conditions, that is into the chest or preferably at the dilute stage of the papermaking process, or it may be added to the forming or formed paper web on the paper machine wire, or to the paper web on the paper machine after leaving the wire, according to well known procedures, as desired. There may also be added at any point in the papermaking system, as is well known, other material such as alum, starch, sizing ingredient, as well as coloring matter, other fillers, and the like as desired. Any pulp or mixture of pulps may be used such as soda, sulphite, sulphate, alpha, groundwood, semichemical, rag, straw and the like, and there may be employed any amount of the calcium carbonate desired, for example for high filled magazine papers, sufficient to give a content of about 25 to 30% of calcium carbonate in the paper is usually desired, and for other papers a lesser content is generally employed. For unsized paper, uncoated calcium carbonate may be employed, and for sized paper uncoated or coated calcium carbonate as desired.

Although there has not yet been time to investigate the filled paper field to the same extent that the coated paper field has been invesigated, the indications are that the filled paper produced is more opaque than is paper made with the same calcium carbonate without processing, that a better finish is obtained, and that in some cases dusting is lessened or avoided. It may be stated in this connection that in certain instances, notably with paper having groundwood furnishes run on high speed paper machines, a certain amount of dusting has been experienced on the calenders, winders and rewinders with paper in which artificially prepared calcium carbonates of certain characteristics have been used as fillers. This dust has been found to contain fibre as well as calcium carbonate. The indications are that the processing of the calcium carbonates in question lessens or avoids this difficulty, resulting in an improved manufacturing process as well as an improved paper.

In the practice of my process, I may, as indicated previously herein, press the calcium carbonate more than once in a mold, e. g., in an hydraulic press, preferably removing it from the mold and comminuting before repressing; and naturally the pressings may be further repeated if desired. In general, however, from the standpoint of economy I prefer to use only one pressing.

I may also subject the calcium carbonate to more than one passage between rolls. The calcium carbonate may be delivered conveniently from one pair of rolls into another pair of rolls, or even back to the same pair of rolls, and any number of passages between rolls may be made. In multiple passages between rolls, in some cases it is possible to form a continuous sheet, which of course is easily broken and with which care should be taken, which however may be fed between a second pair of rolls and even between further pairs of rolls if desired. However in general I prefer to pass the calcium carbonate between rolls only once as this is the simpler and more economical procedure.

I may process my artificially prepared calcium carbonate at any temperature high or low, as high as can be withstood by the equipment employed (limited of course by the decomposition point of calcium carbonate), or as low as may be desired, using refrigerants, but at least as far as processing between rolls is concerned, I prefer as stated to conduct the processing not much above room temperature or somewhat lower if convenient, because the yield appears to be greater at this temperature than when the rolls are run hot. Moreover when rolls are run very hot there are mechanical and lubrication difficulties involved, and these are avoided if the temperature is kept well down, or at least below the boiling point of water.

As will be apparent on consideration, there are other machines than presses and the rolls described which may be used to exert pressure on artificially prepared calcium carbonate. Examples are various kinds of fluted rolls, conical rolls, rolls of regular or irregular shape cooperating with one another, gears, preferably broad face, such as spur, herringbone, mitre, hypoid, and other well known forms, a roll cooperating with more than one other roll, (all of which, as well as the other rolls described herein, are, for the purposes of this specification, included within the term "roll device"), as well as extrusion machines, and the like, but because of simplicity of design, lower cost, ease of both feed and discharge, continuity and uniformity of operation, and relatively low power requirements, I prefer to use cylindrical rolls in pairs, such for example as those described herein.

As is evident, these rolls, instead of being arranged with their axes in a horizontal plane may be arranged with their axes in a plane inclined to the horizontal, or in a vertical plane, but this is merely a matter of mechanical and operating convenience, and so far I have found it more convenient to operate with the axes of the rolls in a horizontal plane.

It will be noted from the data given in Table XXVI, Tests Nos. 196–199, and the discussion immediately preceding that table, that comminuted naturally occurring calcium carbonates, such as ground marble, ground limestone and ground natural chalk, have a low oil absorption; and it may be stated that these materials also usually hav a low adhesive requirement. In view of this it might be thought that the application of pressure to artificially prepared calcium carbonate acts to convert it to calcium carbonate similiar to comminuted naturally occurring calcium carbonate. Such, however, is not the case. Comminuted natural calcium carbonates, e. g., marble, limestone and naturally occurring chalk, although they have a low oil absorption and usually a low adhesive requirement, have other properties which render them either wholly unfitted or very poorly suited for the purposes for which my processed artificially prepared calcium carbonate is eminently suited. For example, such comminuted natural calcium carbonates, even those comminuted as far as commercially feasible, are relatively coarse, settle rapidly, lack capacity, are poor whitening agents, lack covering power, are relatively hard, harsh and abrasive, lack finishing properties, have poor ink receptivity, lack body, spread and brush indifferently or poorly, lack uniformity in particle shape and usually in particle size. My processed artificially prepared calcium carbonates, on the other hand, while embodying new and highly desirable characteristics such as low oil absorption, low adhesive requirement, low water absorption and the like acquired through their subjection to the process herein disclosed, nevertheless retain, or even possess in an enhanced degree, the otherwise wholly desirable properties of the original artificially prepared calcium carbonates such as the fineness of particle size, the uniformity of particle size and shape, and the settling qualities characteristic of the original artificially prepared calcium carbonate, good opacity, high whitening value, good covering power, softness, smoothness and lack of abrasiveness, good finishing properties, good ink receptivity, good body, good spreading and brushing characteristics, and the like. Thus my process does not duplicate natural calcium carbonates, which, whatever their original forms may have been, have been affected or metamorphosed throughout the ages to their present forms by the conditions to which they have been subjected. Rather does my process impart to artificially prepared calcium carbonate new and valuable characteristics without sacrificing, and in some cases even enhancing, the other desirable characteristics already possessed by the artificially prepared calcium carbonate.

As will be apparent, a given pressure in pounds per linear inch on rolls, at least of moderate diameters, achieves a much greater effect than the corresponding pressure figure in pounds per square inch in a press, for the obvious reason, among others, that the pressure in pounds per linear inch is effective on an area at the nip of the rolls much less than an inch wide, and thus actually represents a much greater pressure in pounds per square inch. Of course the larger the diameter of the rolls, the more nearly does the figure of the pressure in pounds per linear inch approach the pressure actually exerted, in pounds per square inch, because the area through which the pressure is applied at the nip of the rolls becomes wider as the diameter of the rolls is increased. This latter fact is the explanation for the situation previously pointed out, namely, that a given pressure per linear inch is more effective on smaller diameter rolls than on larger diameter rolls. The pressures in pounds per linear inch do not, therefore, correspond to the pressures in pounds per square inch, and it is difficult to correlate the two with any degree of closeness even for rolls of any specific diameter, because of the great influence that size of charge in an hydraulic mold has on the results, and also because of the influence of the other factors incident to the operation of both hydraulic presses and rolls, such as have been discussed in detail herein. However, some of the data previously cited herein is compiled in Table XXIX merely for the purpose of indicating the general approximate relationship between the two values, namely, pounds per linear inch and pounds per square inch. The data is derived from tests on similar samples of uncoated calcium carbonate in dry powdered form which gave products of approximately the same oil absorption values, when pressed in one case in an hydraulic press, when passed in another between 6" equal speed rolls, in another between 6" differential speed rolls, and in yet another between 20" equal speed rolls.

*Table XXIX*

| Method of applying pressure | Data from Table No. | Test No. | Oil absorption | Pressure | | Approximate multiple; lbs. per sq. inch÷lbs. per linear inch |
|---|---|---|---|---|---|---|
| | | | | Lbs. per sq. inch | Lbs. per linear inch | |
| Hydraulic press | VII | 40 | 38.5 | 3,000 | | |
| 6" diam. rolls, equal speed | IX | 47 | 38.3 | | 200 | 15 |
| 6" diam. rolls, differ. speed | XV | 132 | 38.4 | | 100 | 30 |
| 20" diam. rolls, equal speed | XIII | 101 | 38.1 | | 1,000 | 3 |
| Hydraulic press | VII | 41 | 36.5 | 4,000 | | |
| 6" diam. rolls, equal speed | IX | 48 | 35.9 | | 500 | 8 |
| Hydraulic press | I | 6 | 28.3 | 25,460 | | |
| 6" diam. rolls, equal speed | IX | 49 | 28.8 | | 1,000 | 25 |
| 6" diam. rolls, differ. speed | XV | 134 | 28.7 | | 500 | 51 |
| 20" diam. rolls, equal speed | XIII | 102 | 29.1 | | 3,000 | 8 |
| Hydraulic press | II | 11 | 22.3 | 100,000 | | |
| 6" diam. rolls, equal speed | IX | 51 | 22.7 | | 3,000 | 33 |
| 6" diam. rolls, differ. speed | XV | 136 | 22.1 | | 3,000 | 33 |
| 20" diam. rolls, equal speed | XIII | 104 | 22.6 | | 10,000 | 10 |
| Hydraulic press | II | 13 | 15.2 | 150,000 | | |
| 6" diam. rolls, equal speed | IX | 55 | 15.0 | | 15,000 | 10 |

An examination of the above table shows that, employing the sample of dry artificially prepared calcium carbonate in question, to obtain the same effect, an hydraulic press requires 8 to 33 times as much pressure in pounds per square inch as do 6" diameter equal speed rolls in pounds per linear inch, 30 to 51 times as much as do 6" diameter differential speed rolls, and 3 to 10 times as much as do 20" diameter equal speed rolls. These values, however, are not to be considered as absolute, but purely as illustrative, as they may vary with conditions, and thus, considering the variables involved, the only conclusions that can with certainty be drawn would appear to be the general ones that the effect obtained at the same number of pounds pressure is much greater when applied as per linear inch with 6" diameter rolls than as per square inch when using an hydraulic press, that the relative differential effectiveness is less with larger diameter rolls, and that the relative differential effectiveness is usually greater with differential speed than with equal speed rolls.

I have referred herein to oil absorption tests and casein requirement tests and have presented ber of drops of water at the several points is considered to have the lower water absorption.

For purposes of illustration there are recorded in Table XXX four such tests, the first pair on an uncoated artificially prepared calcium carbonate at 85.6% dry, before and after it had been processed, and the second pair on a dry uncoated artificially prepared calcium carbonate containing pigment (calcium carbonate magnesium basic carbonate) before and after it had been processed. There is also given in the table the oil absorption of the materials tested for purposes of comparison.

*Table XXX*

| Test No. | Material | Pressure, lbs. per linear inch on equal speed rolls | | Drops of water to reach | | | Oil absorption |
|---|---|---|---|---|---|---|---|
| | | 6" diam. | 20" diam. | 1st point | 2nd point | 3rd point | |
| 105 | Calcium carbonate | | 0 | 11 | 14 | 18 | 54.6 |
| 112 | Calcium carbonate | | 4,000 | 5 | 8 | 12 | 24.3 |
| 195 (before processing) | Calcium carbonate magnesium basic carbonate | 0 | | 25 | 29 | 36 | 55.6 |
| 195 (after processing) | Calcium carbonate magnesium basic carbonate | 5,000 | | 11 | 16 | 22 | 25.0 | data in connection therewith. Although these tests are usually considered the most reliable that technologists have so far been able to devise for measuring the properties in question, nevertheless, owing to their nature, these tests, as is well known, are not only not of the same order of accuracy as ordinary gravimetric analytical determinations, but are also not as strictly reproducible by other workers owing to the personal judgment of the individual worker involved in deciding upon the end points of the tests. Thus although these tests presented herein have been carried out carefully by skilled technicians, they are not offered as representing absolute numerical values, but rather as showing the general and relative magnitude of the effects obtained, within the well known limits of error to which those skilled in the art recognize that these tests are subject.

I have stated herein that the water absorption of artificially prepared calcium carbonate is reduced by processing according to my invention. This may be noted by comparing a mixture of artificially prepared calcium carbonate and a definite quantity of water (such as is made for admixture with an adhesive in the test for adhesive requirement), with a similar mixture of the same calcium carbonate after processing by my method. In general, the aqueous mixture of the original calcium carbonate is substantially less fluid than the corresponding aqueous mixture of the processed calcium carbonate. So far as I know, the art has not standardized on any test for determining the water absorption of a pigment, and therefore a test was devised for measuring this property on comparative samples. Briefly, the test consists of adding to one gram of the calcium carbonate to be tested successive drops of water from a burette, stirring, and noting, in the first place, the number of drops taken to the point where the material forms into lumps (first point), continuing the procedure and noting, secondly, the number of drops added to the point at which the lumps soften (second point), and then continuing the addition of water still further up to the point where the material is just converted into a thick cream and noting, thirdly, the number of drops required to reach this point (third point). That calcium carbonate requiring the lesser num- As will be apparent, low water absorption is in many cases a very advantageous property for calcium carbonate to possess, for example where it is desired to prepare an aqueous mix containing a high percentage of calcium carbonate, yet one which will have a relatively low viscosity and which will spread well. Moreover it enables a more concentrated slurry to be pumped, handled and compounded at a given fluidity, which is of great practical utility in many instances. By my process, the conversion of artificially prepared calcium carbonate, having the property of high water absorption, into calcium carbonate possessing the property of low water absorption is now made feasible.

In my Patent No. 2,189,832, issued February 13, 1940, I have disclosed that calcium carbonate prepared by reacting carbon dioxide and lime in the presence of an alkaline alkali metal compound such as sodium carbonate, requires a substantially lesser percentage of adhesive, e. g., when used in the manufacture of coated paper, than that made in the absence of an alkaline alkali metal compound. I have found that the adhesive requirement of calcium carbonate made as described in the above patent is even further reduced by subjecting it to the process disclosed herein. Its oil absorption is also reduced.

I have stated previously herein that it is desirable at times to coat the particles of calcium carbonate for certain uses, for example for use in the paint industry, rubber industry, for making sized filled paper, as well as for other purposes. In paints, rubber and the like the coating of the particles brings about a greater compatibility of the calcium carbonate particles with the vehicle or material in which the calcium carbonate is incorporated, and in some cases has the additional advantage of imparting substantially improved characteristics to the product in which it is employed. This is well known to those skilled in the art. Various materials may be used for coating the particles, such as fatty acids, salts of fatty acids or soaps, fats, oils, waxes, rosin, natural or synthetic resins, resin acids, paraffine and the like, using if desired the substances themselves, or solutions, emulsions, or dispersions thereof. For example, a paraffin emulsion may be used to coat the particles of calcium carbonate, as is disclosed in my Patent No. 1,993,750, issued March 12, 1935. Fatty acids such as palmitic, stearic, oleic, lauric, linoleic and the like, or acids such as naphthenic, as well as fats, animal or vegetable oils, waxes and the like may be used, conveniently by mixing the calcium carbonate in the form of an aqueous suspension directly with the coating material in question, preferably with vigorous agitation, preferably at a temperature at which the coating material is liquid, thereby coating the particles, or a soap may be employed either alone, or if a soluble soap sometimes with a precipitant such as calcium chloride, alum or the like.

Sometimes a solid material is ground with the calcium carbonate, conveniently in dry form such as in a ball mill or the like, this being particularly suitable for friable materials such as resins or rosin, rosin being an especially suitable coating for calcium carbonate to be used in the paint industry.

When I desire to coat calcium carbonate particles with rosin, however, the method which I prefer to use is one wherein ammonium resinate is employed. As is known in the art, ammonium resinate may be produced as a thin solution by employing suitable concentrations and temperature when treating the rosin with ammonia, for example by using enough rosin, ammonia and water to give a 3% solution, with 100° F. as reacting temperature, although the concentration may vary somewhat either way as well as the temperature. Or the ammonium resinate may be produced in a thick, viscous or ropy form, for example by the procedure described below. The two modifications of ammonium resinate are entirely distinct, and readily distinguishable from one another upon examination. I have found that the ammonium resinate in the form of a thin solution is not so well suited for my purpose as is the thick form. Thin ammonium resinate does not appear to react well or combine completely with the calcium carbonate, and even after being boiled therewith does not seem to deposit completely thereon, as the residual liquid withdrawn from the treated calcium carbonate appears to contain rosin still in a dissolved condition. On the other hand the thick ropy type of ammonium resinate, even though it be largely diluted with water, reacts, combines or becomes associated substantially completely with the calcium carbonate, at least in amounts up to approximately one to one and a half percent on the weight of the calcium carbonate. even at a relatively moderate temperature. During the treating of the calcium carbonate with the ammonium resinate, and/or possibly finally during the drying operation, the ammonium resinate, at least in the approximate amounts indicated above, is substantially completely reacted upon or decomposed, or becomes associated with the calcium carbonate so that the rosin in insoluble form, whether it be as rosin, or possibly as calcium resinate, or a mixture of the two, or otherwise, is deposited as a coating on the calcium carbonate particles. However that may be, up to approximately the amounts indicated, there appears to be substantially no residual rosin in soluble form remaining in the liquid withdrawn from the treated calcium carbonate. The residual ammonium compound or ammonia which results after the rosin has been deposited on the calcium carbonate is eliminated with the water, drawn off the treated calcium carbonate after sedimentation, or filtered therefrom, or is expelled during the drying of the calcium carbonate.

As an example of one procedure for making the viscous form of ammonium resinate, I take 114 gallons of water at approximately 100° F. and add 6 gals. of 26° commercial aqua ammonia. While maintaining vigorous agitation, I add 50 lbs. of rosin preferably in pulverized form, material which will pass through 40 to 50 mesh being satisfactory, adding the rosin preferably gradually and continuously over the period of a few minutes to avoid lumping. The agitation is continued until all the rosin is in solution, which may take upwards of an hour, depending on the degree of agitation. If the solution shows any tendency to remain thin, the thick ropy form may be obtained by increasing the vigor of the agitation, and if the solution becomes too viscous more water may be added as desired. As will be apparent to one skilled in the art, other proportions of ingredients and other procedures may be used, the only requirement being that the ammonium resinate be produced in the thick, viscous, ropy form.

This solution of ammonium resinate, preferably considerably diluted and preferably screened to remove any impurities or chance particles of undissolved rosin, is then added in an appropriate quantity to a slurry of calcium carbonate. For example a calcium carbonate suspension of 10% solid content is a convenient one to use, and while any temperature may be used, I have found it convenient to use a temperature somewhat warm, conveniently about 120° F. The ammonium resinate solution is preferably added while maintaining the calcium carbonate suspension in vigorous agitation, using the desired amount of rosin as ammonium resinate on the weight of the calcium carbonate employed, conveniently 1 to 2%. Any other proportions may be used of course as desired. The calcium carbonate after treatment is usually dewatered, e. g., on a rotary filter, and dried if desired.

I have referred to subjecting artificially prepared calcium carbonate to pressure in a mold, by means of a press, in dry form as well as in moist form, citing examples with moisture content up to 20%. I have also subjected calcium carbonate samples containing much higher moisture contents to pressure in a press, for example calcium carbonate in a soft pasty condition with a moisture content of about 50 to 55%. When calcium carbonate with relatively high moisture content is to be subjected to pressure in a press, the mold should be preferably provided with a water permeable material such as a filter cloth on at least one inner surface, and a supporting medium therefor, as a perforated plate or grid, and an outlet so that the water exuding during the pressing may escape.

I have not yet determined the cause or causes of the striking changes effected by the application of pressure, or pressure and momentary attrition. on artificially prepared calcium carbonate. The result does not appear to be one effected by the compressing or compressing and attriting means directly on the individual isolated particles of calcium carbonate—except of course on such relatively small proportion of the particles as may be in contact with said means—but rather an effect, induced by said means, of the particles of the calcium carbonate on the other particles thereof substantially in contact therewith. One theory that I have formed which may explain, at least in part, the striking changes effected is that the ultimate particles of the calcium carbonate are subjected to a physically compacting or deforming or straining effect which may change the surface characteristics of the particles, or electrical energies or chemical bonds associated with the surface of the particles, and this may result in the profound changes herein disclosed in the properties of the calcium carbonate processed in accordance with my invention. One piece of evidence which may support this view is the fact that it has long been known that by applying pressure to the surface of large individual crystals, an electric charge is generated. This is termed the "piezo-electric" effect, and is employed practically in some electrical devices. Thus it may well be that the pressure, or pressure and momentary attrition, disturbs or changes the electrical or electrochemical condition of the calcium carbonate particles or their surfaces, and the new condition reached as the result thereof may account for the change in properties observed, the magnitude of the change in properties increasing with the severity of the treatment.

As disclosd herein, I have passed artifically prepared calcium carbonate, both uncoated and coated, between rolls either in the form of a powder, or as aggregates, agglomerates, crumbs or granules, or as lumps, or in precompacted form such for example as when it has previously been passed between rolls. Moreover I have passed it between rolls either dry, or containing water to the point where the calcium carbonate still retains its more or less powdery or crumbly form, or containing still more water up to and including the point where it attains a paste-like consistency. In all of these conditions the particles of the calcium carbonate are either in contact directly, or in contact except possibly for a film of water and/or of coating if such be employed, and thus in either case the particles may be said to be "substantially in contact," and when I use such expression I intend it to include such conditions. Of course, as indicated hitherto herein, I may pass between rolls a pigment which comprises artificially prepared calcium carbonate, such as calcium carbonate magnesium hydroxide or calcium carbonate magnesium basic carbonate, or I may, if desired, pass between the rolls mixtures containing a substantial proportion of artificially prepared calcium carbonate with any other pigment, the mixtures being either dry or containing any amount of water up to and including the point where the mixture assumes a paste-like consistency, but in such mixtures, although other pigment is present, it is present in more or less finely divided particulate form, more or less intimately blended with the calcium carbonate particles which are thus not substantially separated from contact with one another, and thus the calcium carbonate may still be said to have its particles "substantially in contact"; and I mean to include such situations within the scope of this expression as used herein.

I have stated above herein that in my process the application of attriting action by differential speed rolls is of "momentary" duration, by which I mean that it never has a duration of over 15 seconds, and usually is very much less, generally being only a fraction of a second. It is likewise true that in my process the application of pressure by rolls, whether of equal or differential speed, is also of similar momentary duration. The application of pressure by a press such as an hydraulic press, may of course be for any length of time desired, but in actual practice, it is likewise of similar momentary duration, the pressure being run up to the required point as fast as the equipment will permit and then being immediately released. When passing artificially prepared calcium carbonate between rolls or when pressing it in a press, there appears to be no advantage, from the evidence so far adduced, in prolonging the duration of the application of pressure beyond the momentary duration indicated herein, because as soon as the desired pressure has been applied, the result is effected.

In this specification I have advanced several theories as partial or complete explanation of various conditions and effects, but it is to be distinctly understood that the scope of my invention is independent of theory, and that my invention is not limited or affected by the above theories or any of them, or by their validity or invalidity, as regardless of these or any other theories, the facts are as stated herein.

While I have described in detail the preferred embodiment of my invention, it is to be understood that the details of procedure, the proportions of ingredients, the arrangement of steps, and the mechanical devices used, are presented for purposes of illustration only, and may be widely varied without departing from the spirit of my invention or the scope of the subjoined claims.

I claim:

1. In the treatment of pigment comprising artificially prepared calcium carbonate to modify characteristics thereof, the improvement which consists in submitting said pigment to a mechanical processing action in which said pigment, the particles thereof being substantially in contact, is subjected to compressing means substantially as described for a period of not over substantially one second, said action being of intensity not less than that which would be obtained by passage between a pair of rotating 6 inch diameter equal speed hard surface cylindrical rolls rotating in opposite directions, with axes substantially parallel, urged toward each other to provide a pressure not less than 25 lbs. per linear inch, and said intensity being sufficient to effect a substantial change in the properties of said pigment including the reduction of its oil absorption and of its adhesive requirement to not more than 90% of their respective original values.

2. A process according to claim 1 in which said processing action is effected by subjecting said pigment to the action of a roll device producing compression and attrition.

3. In the treatment of pigment comprising artificially prepared calcium carbonate to modify characteristics thereof, the improvement which consists in submitting said pigment to a mechanical processing action for a period of not over substantially one second, in which action said pigment, the particles thereof being substantially in contact, is passed between a pair of rotating rolls under sufficient pressure per linear inch therebetween to produce an effect of intensity not less than that which would be obtained by passage between a pair of rotating 6 inch diameter equal speed hard surface cylindrical rolls rotating in opposite directions, with axes substantially parallel, urged toward each other to provide a pressure not less than 25 lbs. per linear inch, and said intensity being sufficient to effect a substantial change in the properties of said pigment including the reduction of its oil absorption and of its adhesive requirement to not more than 90% of their respective original values.

4. A process according to claim 3 in which the rolls of the pair first referred to therein are rotating in opposite directions at substantially equal peripheral speeds.

5. A process according to claim 3 in which the rolls of the pair first referred to therein are rotating at different peripheral speeds.

6. A process according to claim 3 in which the designated pressure between the comparison 6 inch diameter rolls is not less than 100 lbs. per linear inch.

7. A process according to claim 3 in which the designated pressure between the comparison 6 inch diameter rolls is not less than 500 lbs. per linear inch.

8. A process according to claim 3 in which the designated pressure between the comparison 6 inch diameter rolls is not less than 1000 lbs. per linear inch.

9. A process according to claim 3 in which said pigment under treatment is associated with water, and in which the intensity of the effect is not less than that which would be obtained by passage of said pigment, in the absence of water, between the comparison rolls.

10. A process according to claim 3 in which said pigment under treatment is associated with water in sufficient quantity substantially to form a paste therewith, and in which the intensity of the effect is not less than that which would be obtained by passage of said pigment, in the absence of water, between the comparison rolls.

11. A process according to claim 3 in which said pigment under treatment is associated with water and in which at least one of the rolls of the pair first referred to therein is provided with a covering having a rough surface, said pigment being in contact therewith as it passes between said rolls.

12. A process according to claim 3 in which said pigment under treatment is associated with water and in which at least one belt is provided which passes between the pair of rolls first referred to therein, said pigment being in contact with said belt as said pigment passes between said rolls.

13. A process according to claim 3 in which said pigment under treatment is associated with water and in which at least one of the rolls of the pair first referred to therein is adapted for exerting suction, and exerts suction upon said pigment as it passes between said rolls.

14. A process according to claim 3 in which said pigment under treatment is associated with water in sufficient quantity substantially to form a paste therewith, and the rolls of the pair first referred to therein are adapted for exerting suction in a zone including the nip of said rolls, each of said rolls being provided with a water permeable covering, said pigment being in contact with both of said water permeable coverings and being subjected to said suction as it passes between said rolls.

15. A process according to claim 3 in which said pigment under treatment is associated with water in sufficient quantity substantially to form a paste therewith, and the rolls of the pair first referred to therein are adapted for exerting suction in a zone including the nip of said rolls, each of said rolls being provided with a water permeable belt passing thereover and between the nip of said rolls, said pigment being in contact with the outer surfaces of said belts and being subjected to said suction as it passes between said rolls.

16. A process according to claim 3 in which water is applied to the surface of at least one of the rolls of the pair first referred to therein, said water being in contact with said pigment as it passes between said rolls.

17. In the treatment of pigment comprising artificially prepared calcium carbonate to modify characteristics thereof, the improvement which consists in submitting the same to a mechanical processing action, said action requiring for its completion a period of not over substantially one second, in which action said pigment, the particles thereof being substantially in contact, is subjected by a press to a pressure not less than substantially 600 pounds per quare inch, said pressure being sufficient to effect a substantial change in the properties of said pigment including a reduction of its oil absorption and of its adhesive requirement to not more than 90% of their respective original values.

18. The process of treating calcium carbonate comprising subjecting it to intimate contact with a solution of the viscous variety of ammonium resinate, and then drying the so treated calcium carbonate.

19. In the treatment of a pigment comprising artificially prepared calcium carbonate, the improvement which consists in submitting said pigment to a mechanical processing action in which the pigment particles are subjected to a single instantaneous compression of an intensity sufficient to effect a reduction of the oil absorption and of the adhesive requirement of said pigment to not more than 90% of their respective original values.

HAROLD R. RAFTON.